(12) United States Patent
Major, Jr. et al.

(10) Patent No.: US 12,523,505 B2
(45) Date of Patent: Jan. 13, 2026

(54) MONITORING TAG DEVICE SYSTEMS AND METHODS

(71) Applicant: SensThys, Inc., Cupertino, CA (US)

(72) Inventors: Jo S. Major, Jr., Cupertino, CA (US); Bradley D. Gaiser, Cupertino, CA (US)

(73) Assignee: SensThys, Inc., Cupertino, CA (US)

( * ) Notice: Subject to any disclaimer, the term of this patent is extended or adjusted under 35 U.S.C. 154(b) by 202 days.

(21) Appl. No.: 18/198,770

(22) Filed: May 17, 2023

(65) Prior Publication Data

US 2023/0375381 A1 Nov. 23, 2023

Related U.S. Application Data

(60) Provisional application No. 63/355,851, filed on Jun. 27, 2022, provisional application No. 63/342,992, filed on May 17, 2022.

(51) Int. Cl.
| | |
|---|---|
| *G01D 7/00* | (2006.01) |
| *G01D 7/08* | (2006.01) |
| *G01D 21/02* | (2006.01) |

(52) U.S. Cl.
CPC .............. *G01D 7/00* (2013.01); *G01D 7/08* (2013.01); *G01D 21/02* (2013.01)

(58) Field of Classification Search
CPC ............ G01D 7/00; G01D 7/08; G01D 21/02; G06K 19/0717
See application file for complete search history.

(56) References Cited

U.S. PATENT DOCUMENTS

| | | | |
|---|---|---|---|
| 9,727,812 B2 * | 8/2017 | Forster ............... | G06K 19/0723 |
| 10,481,189 B2 | 11/2019 | Kuyenhoven | |
| 2018/0284749 A1 | 10/2018 | Cella | |
| 2019/0041835 A1 * | 2/2019 | Cella ..................... | G06N 3/047 |
| 2021/0070115 A1 * | 3/2021 | Rokhsaz ................. | H04B 5/77 |

FOREIGN PATENT DOCUMENTS

| | | | | |
|---|---|---|---|---|
| AU | 2008331309 A1 * | 6/2009 | ............... | G01D 5/16 |
| JP | 2004348496 A * | 12/2004 | ......... | G06K 19/0723 |

\* cited by examiner

*Primary Examiner* — Francis C Gray

(57) ABSTRACT

Efficient and effective internal material property monitoring systems and methods are presented. In one embodiment, a method for monitoring variations in an internal material property of an object comprises sensing variations in a characteristic over time and communicating information on the variations in the characteristic from within the object to a remote component, wherein the communication is wireless. The characteristic is related to an internal material property of an object and the variations are sensed from within the object. The characteristic can be related to a parameter associated with the material property. The characteristic can be one of a plurality of characteristics sensed, and the sensed variations are associated with a plurality of various material characteristics of a material in the object (e.g., material properties related to a composite material, etc.). A plurality of data points can be collected and the plurality of data points correspond to the sensing of the characteristic. In one embodiment, an analysis of the information is performed and a visualization is presented of the characteristic being sensed over time. The variations can be mapped to physical propertied of a material in the object.

18 Claims, 22 Drawing Sheets

100
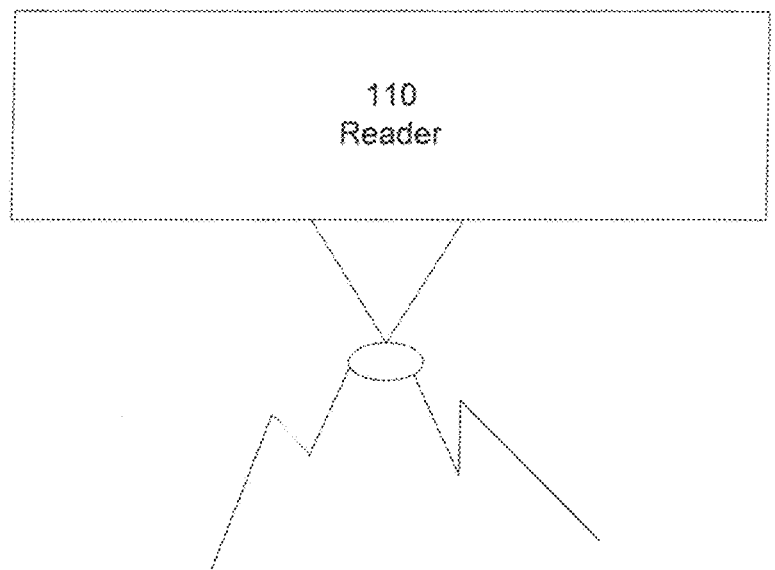
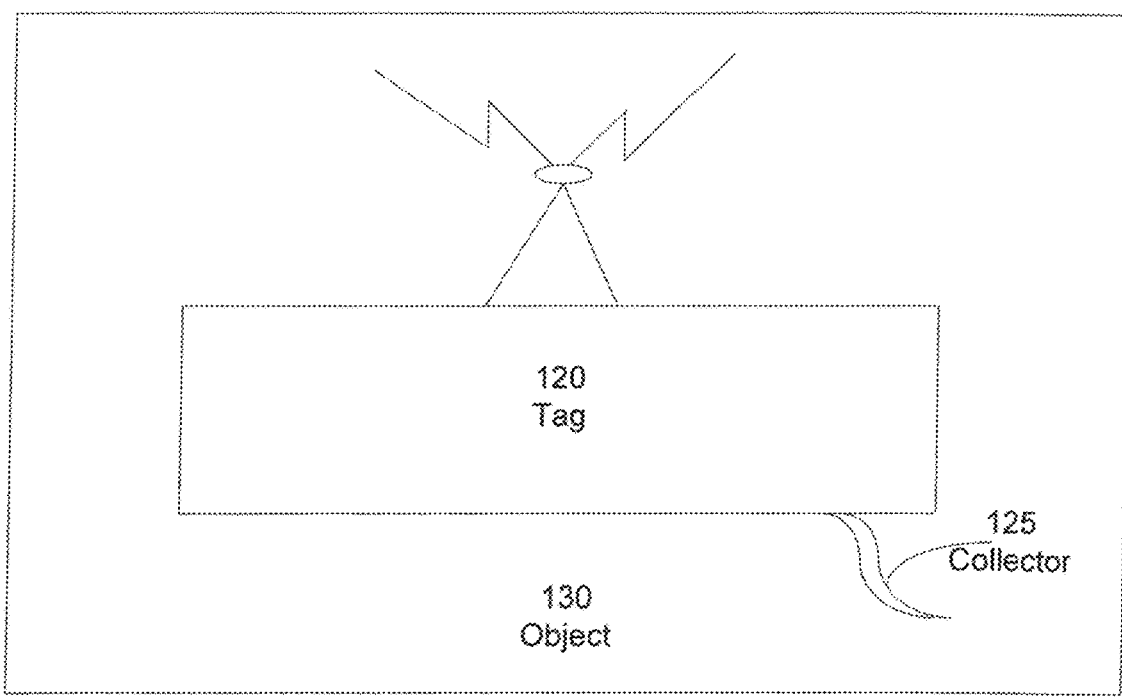
FIG 1

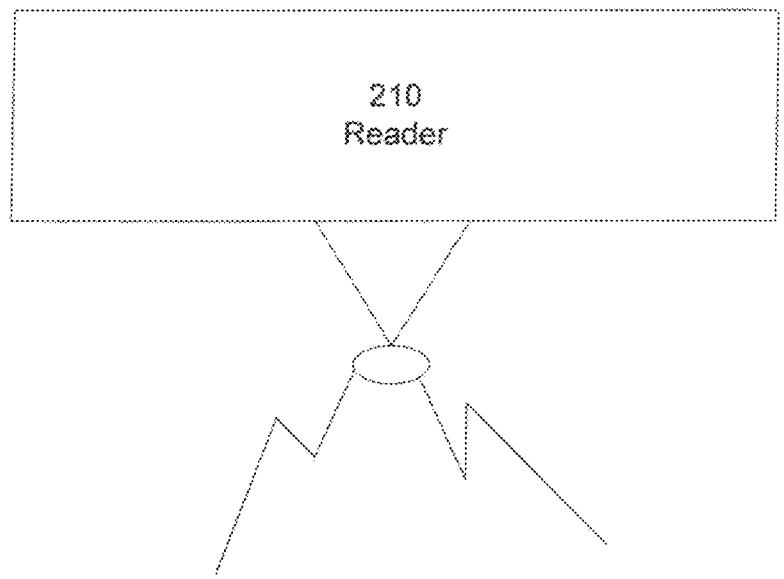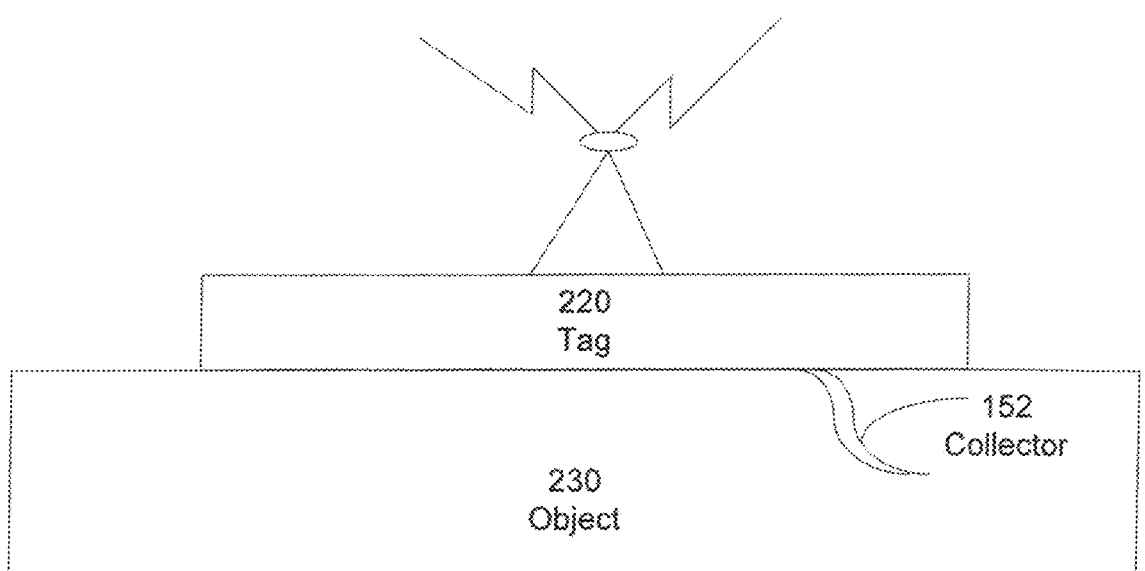
FIG 2

300
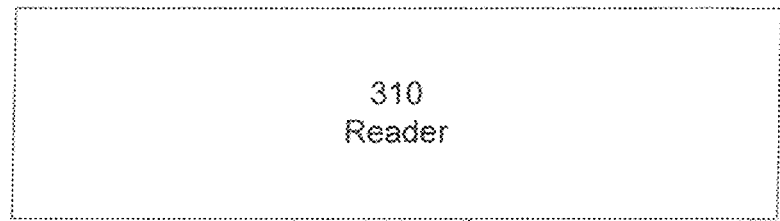
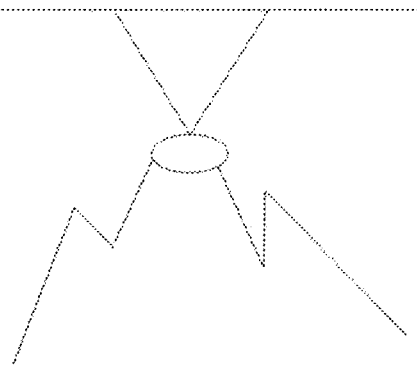
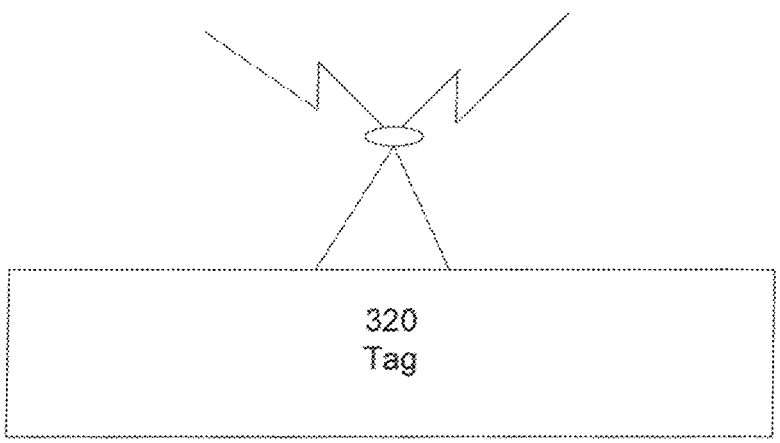
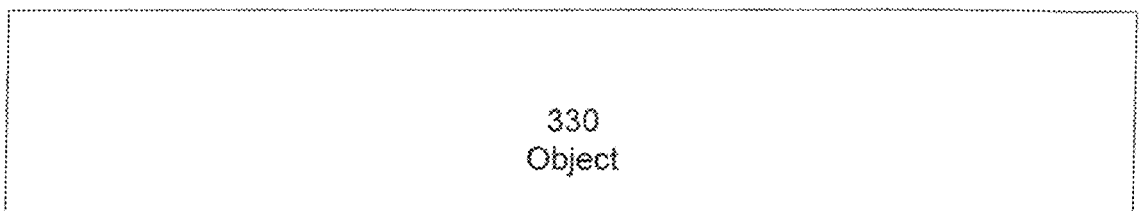
FIG 3

500

505
A monitor tag device is powered up
(e.g., energy from internal source, harvested, external source, etc.)

510
Sensing variations in a characteristic over time, wherein the characteristic is related to an internal material property of an object and the variations are sensed from within the object.

520
Communicating information on the variations in the characteristic from within the object to a remote component, wherein the communication is wireless.

540
Mapping variations to physical properties of the material.

550
Performing analysis operations are optionally performed on the information.

710
Tags and sensors are placed in position.

720
Fibers are placed in a mold.

730
A mold is evacuated.

740
Resin is added.

750
A monitoring process is performed utilizing a monitoring tag device

770
Adjustments in epoxy process and environmental controls are selectively made based upon information obtained from the monitoring process.

790
The epoxy process is ended and the object is removed from the mold.

FIG 7

| Metric | Value |
|---|---|
| Resin Arrival (min) | 3.5 |
| Phase Change (min) | 49.3 |
| T,max (time, min) | 51 |
| T,max (F) | 257 |
| SCDE (cured) | 260 |
| SCDE (min) | 180 |
| SCDE (120min) | 68.4% |
| SCDE (180min) | 82.8% |
| SCDE (240min) | 90.0% |

1505
A monitor tag device is powered up (e.g., energy from internal source, harvested, external source, etc.)

1510
Sensing variations in a characteristic that affects a resonate antenna over time, wherein the characteristic is related to an index of refraction of the material in the object and variations on a real-time S-curve position (S-code) of the antenna.

1520
Communicating information to and from a remote device wirelessly, wherein the information includes indications of variations in the characteristic.

1530
Mapping the information on the variations in the characteristic over time to a material property of the object.

1550
Performing operations on the information.

FIG 15

|  | 30/70 | 40/60 | 50/50 | 60/40 |
|---|---|---|---|---|
| Epoxy Arrive (Sensor Code) | 193.5 | 190.6 | 185.0 | 183.0 |
| Sensor Code Minima | 188.8 | 179.5 | 167.0 | 171.7 |
| Decrease > Solid Phase | 4.7 | 11.1 | 18.0 | 11.3 |
| Final SCDE Value | 213.6 | 203.1 | 214.3 | 214.8 |
| SCDE increase | 24.8 | 23.6 | 47.3 | 43.1 |
| T,max (C) | 76.0 | 83.0 | 100.0 | 77.6 |
| Width of Temp Peak (hrs) | 2.0 | 1.3 | 1.1 | 1.8 |
| Time (T,max) | 1.00 | 0.91 | 0.91 | 1.21 |

```
2110
Read information from a monitor tag device.
```

```
2120
Analyze the information.
```

```
2130
Implement an action in response to the results of the analysis.
```

FIG 21

MONITORING TAG DEVICE SYSTEMS AND METHODS

RELATED APPLICATIONS

This application claims the benefit of and priority to the following provisional applications:
  63/342,992 entitled Passive Sensing in Composite Materials filed on May 17, 2022, and
  63/355,851 entitled Quality Control for Composite Materials filed on Jun. 27, 2022,
which are all incorporated herein by reference

FIELD OF INVENTION

The present subject matter is related to systems and methods configured to sense characteristics associated with monitoring material properties of an object.

BACKGROUND

Various materials are included in numerous useful objects utilized in many beneficial applications. The objects can be created by various processes (e.g., fabrication, manufacture, construction, etc.) and utilized in different applications (e.g., transportation vehicles, infrastructure and construction structures, power generation equipment, manufactured products, etc.). Both the creation and use of the objects are often impacted by properties of the material included in the objects. Monitoring of the material properties is important for effective and reliable creation and use. The state of material properties provides an indication of whether an object is properly created and fit for continued use (e.g., proper curing, intrusive/improper material, contaminants moisture, wear and tear, safety, deterioration, failure, etc.). However, traditionally efficient and effective monitoring of material properties is often problematic and difficult.

There are various reasons the monitoring of an object's internal material properties is traditionally impractical (e.g., technological limitations, cost prohibitive, etc.). Conventional attempts at monitoring an object's internal properties are usually complex in implementation and limited in results. Conventional attempts at monitoring internal material properties of an object (e.g., an epoxy component, a wind turbine blade, etc.) can involve complex wired connections to sensors and complex sensing control equipment. Conventional monitoring sensors and associated wiring can detrimentally interfere with both the creation of the object and functionality of the object. Wires penetrating the mold of an object can complicate the creation of both the object and the mold. If the wires remain connected to the object they can interfere with the operation of the object e.g., a wind turbine are typically to have no metal on a blade, metal wires left in a non-metallic object can cause metallic corrosion issues that would not otherwise be a problem, etc.). If the wires are removed from the object, holes left in the object after removing the wires can interfere with the operation of the object (e.g., cause structural weakness issues, act as penetration points for corrosive elements, etc.).

The results are often limited in both the type of sensing and amount of sensing. Due to complexity and cost, conventional sensing is typically limited in scope and the amount of points/areas of the object that are sensed/monitored. In addition, results directly associated with a particular object are often not available. Material property results from a similar or comparable "sister" object are utilized to extrapolate or guess the material properties of the particular object (rather than actual direct sensing of the particular object).

SUMMARY

Efficient and effective internal material property monitoring systems and methods are presented. In one embodiment, a monitoring tag device comprises, a sensing component, a control component, and a wireless component. The sensing component is configured to sense variations in a parameter/characteristic over time, wherein the parameter/characteristic is related to material properties of a material in an object. In one embodiment, the parameter/characteristic is selected from the group comprising temperature, strain, index of refraction, moisture, relative humidity, motion, differential capacitance, light, PH level, and pressure. The control component is coupled to the resonant antenna sensing component, wherein the control component comprises an electronic component configured to recognize an indication of the variations in the parameter/characteristic over time. The wireless component is operable to communicate with a remote device, by transmitting information associated with the variations in the parameter/characteristic. In one embodiment, the sensor includes a sensing component selected from the group comprising a resonant antenna, a capacitor, a piezo component, a MEMS component, a thermistor, a wheatstone bridge, a reverse biased PN junction, and PH sensor.

In one embodiment, the sensor is located within a portion of the material of the object and wherein the variations are associated with a material parameter/characteristic inside the material. In one embodiment, the sensor is located within a sensing distance to a surface of the material of the object and wherein the variations are associated with a material parameter/characteristic inside the material. The sensor can be located within a chemical reaction of an internal material of the object and senses a fundamental change in the material property of the object. In one exemplary implementation, the material property is related to a composite material. The variations of the parameter/characteristic over time can be associated with a curing process. The variations of the parameter/characteristic over time can be associated with changes in the material properties resulting from use of the object. In one embodiment, the wireless component comprises a transceiver antenna. In one exemplary implementation, the transceiver antenna is operable to harvest energy from an externally generated electromagnetic signal. In one embodiment, a monitoring tag device comprises a compact housing that contains the resonant antenna sensing component, the wireless unit, and the control component.

In one embodiment, a material internal property monitoring method comprises: sensing variations in a parameter/characteristic that affects a resonant antenna over time, wherein the is related to material properties of a material in an object, and communicating information to and from a remote device wirelessly, wherein the information comprises indications of variations sensed in the. In one embodiment, the parameter/characteristic is selected from the group comprising temperature, strain, index of refraction, moisture, relative humidity, motion, differential capacitance, light, PH level, and pressure. In one embodiment the method further comprises mapping the information on the variations sensed in the parameter/characteristic over time to a material property of the object. The sensor can be located within a portion of the material included in the object and the variations are associated with a material property inside the material. The sensor can be located on a surface of the material included in the object and the variations are associated with a material property inside the material. In one embodiment, energy is harvested (e.g., by a wireless transceiver component from an externally generated signal, from motion, etc.). In one embodiment the parameter/characteristic is one of a plurality sensed parameter/characteristic that are sensed. In one embodiment, the method further comprises performing operations on the information: and presenting modified data in a visual representation/report, wherein the modified data corresponds to results of performing operations on the information. The method can also include translating variations associated with the index of refraction to a parameter/characteristic of the material.

In one embodiment, a method for monitoring variations in an internal material property of an object comprises sensing variations in a characteristic over time and communicating information on the variations in the characteristic from within the object to a remote component, wherein the communication is wireless. The characteristic is related to an internal material property of an object and the variations are sensed from within the object. The characteristic can be related to a parameter associated with the material property. The characteristic can be one of a plurality of characteristics sensed, and the sensed variations are associated with a plurality of various material characteristics of a material in the object (e.g., material properties related to a composite material, etc.). A plurality of data points can be collected and the plurality of data points correspond to the sensing of the characteristic. In one embodiment, an analysis of the information is performed and a visualization is presented of the characteristic being sensed over time. The variations can be mapped to physical propertied of a material in the object.

In one embodiment, a monitoring tag device comprises multiple sensing components configured to sense variations in different characteristics over time, wherein the characteristics are related to material properties of an object. A plurality of data points can be collected over time for each of the characteristics.

BRIEF DESCRIPTION OF THE DRAWINGS

The accompanying drawings, which are incorporated in and form a part of this specification, illustrate embodiments of the invention and, together with the description, serve to explain the principles of the invention. Unless otherwise noted, the drawings may not be drawn to scale.

FIG. 1 is a block diagram of an exemplary material monitoring system in accordance with one embodiment.

FIG. 2 is a block diagram of another exemplary monitoring system configuration in accordance with one embodiment.

FIG. 3 is a block diagram of yet another exemplary monitoring system in accordance with one embodiment.

FIG. 5 is a flow chart of an exemplary monitoring tag method in accordance with one embodiment.

FIG. 7 is a flow chart of an exemplary epoxy process in accordance with one embodiment.

FIG. 12B is a table of exemplary values corresponding to the graph in FIG. 12A in accordance with one embodiment.

FIG. 15 is an exemplary material internal property monitoring method in accordance with one embodiment.

FIG. 18 is an exemplary table listing of metrics of the curing process as a function of the mix ratio of parts A and B of a two-part resin in accordance with one embodiment.

FIG. 21 is a flow chart of an exemplary monitor tag method in accordance with one embodiment.

DETAILED DESCRIPTION

Figure 4:
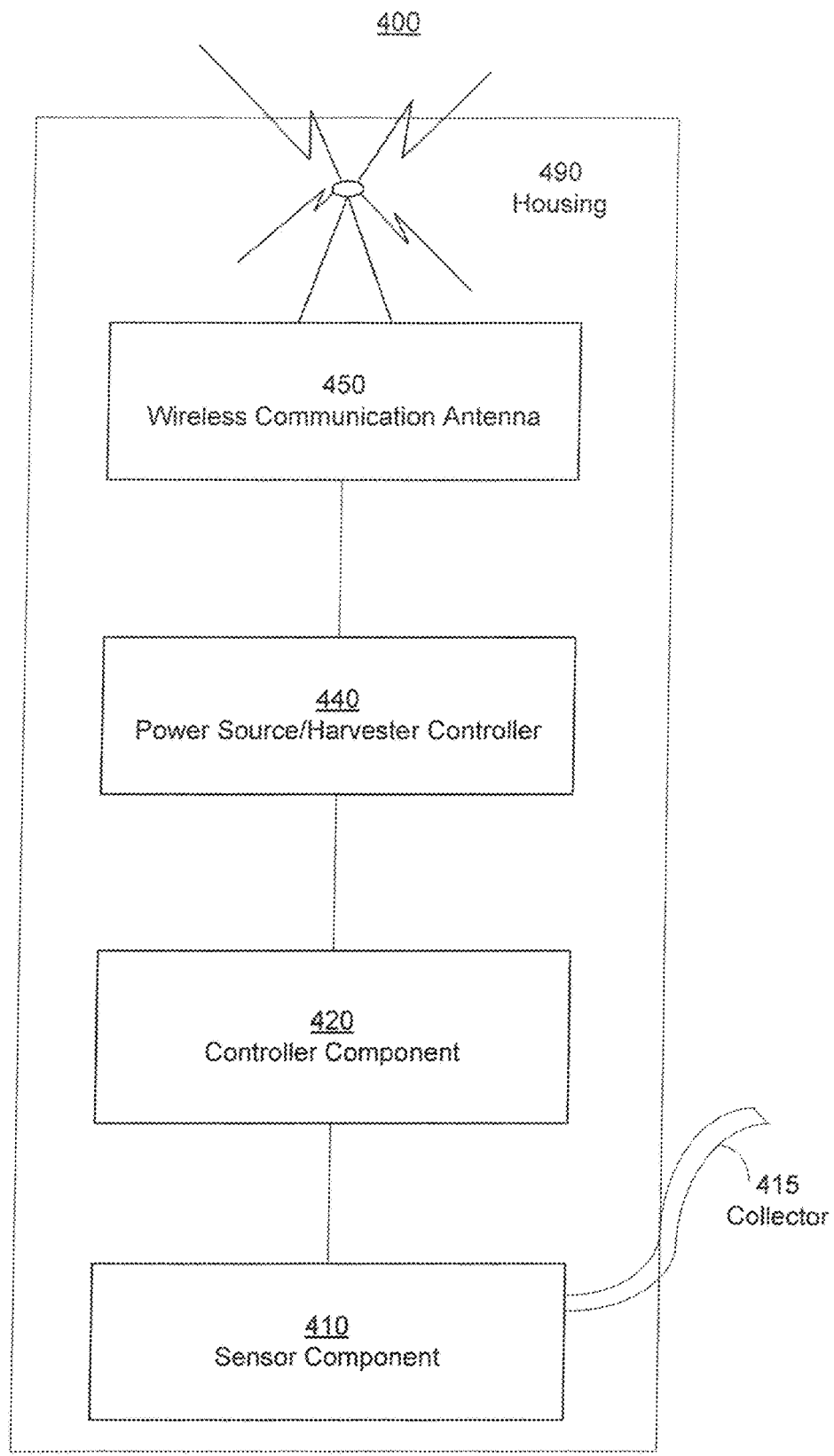
FIG. 4 is a block diagram of an exemplary monitoring tag device in accordance with one embodiment.

Reference will now be made to various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The accompanying drawings, which are incorporated in and form a part of this specification, are included for exemplary illustration of the principles of the present invention and are not intended to limit the present invention to the particular implementations illustrated therein. The drawings are not to scale unless otherwise specifically indicated.

The figures are not necessarily drawn to scale, and portions of the devices and structures depicted, as well as the various layers that form those structures, are shown. For simplicity of discussion and illustration, only one or two devices or structures may be described, although in actuality more than one or two devices or structures may be present or formed. Also, while certain elements, components, and layers are discussed, embodiments according to the invention are not limited to those elements, components, and layers. For example, there may be other elements, components, layers, and the like in addition to those discussed.

Presented novel systems and methods provide efficient and effective configuration of monitoring systems and methods, including monitoring of composite materials. In one embodiment, a monitoring tag device monitors the formation of objects. In one exemplary implementation, the monitoring tag monitors parameters associated with material properties of the object. A monitoring tag device can also monitor the object after formation. It is appreciated the monitoring tag devices can be utilized in various monitoring applications (e.g., manufactured objects, constructed objects, etc.). In one embodiment, there is very minimal or no interference with formation or use of the object by the monitoring tag. In one exemplary implementation, a monitoring tag includes a sensor, a control component, and a communication component. The sensor senses parameters associated with the monitoring. The communication component wirelessly communicates information associated with the sensing to other components remote from the monitoring tag device.

In one embodiment, a low-cost, passive sensor, without batteries or wires, is remotely interrogated for composite manufacturing monitoring and composite object/part monitoring post-manufacturing. The sensors can simultaneously detect multiple physical parameters (e.g., temperature, complex dielectric constant, strain, moisture, RH, index of refraction, capacitance, pressure, etc.). In one exemplary implementation, the reader/interrogator for the sensor is in a range of several meters away from the sensor. In addition, the sensor can be read through a variety of materials, (e.g., Teflon, fiberglass, plastics, wood, metallic heating elements, metal screens, etc.). Thus, a sensor inside of an object, mold, and so on can be wirelessly detected from a reader/interrogator outside of the mold. In one exemplary implementation, the sensor is unobtrusive enough (e.g., thin, small, flexible, etc.) to cause minimal or no perturbation to the object creation and use (e.g., flow processes within the mold, rotating wind turbine, etc.) and may optionally be left in the mold permanently.

It is appreciated there are numerous approaches to establish a sensing coupling of a sensor and an object. In one embodiment, a sensor is located in a desired position to establish a sensing coupling of a sensor and an object (e.g., located within an object, in contact with an outer surface of an object, in close proximity to an object, etc.). In one exemplary implementation, a sensor is placed in a desired position (e.g., to establish a sensing coupling, etc.) before, while, and after a material is added to an object creation process (e.g., put in a formed area for a concrete pour, put in a mold, etc.).

In one embodiment, a monitoring tag device system and method are utilized for quality control of composite materials. In one embodiment, a monitor tag is utilized to monitor the inputs to a composite manufacturing process, the composite manufacturing process itself, and the properties of a completed product. In one embodiment, a wireless, battery-free monitor tag/sensor brings enormous ease of use, while using the low-cost wireless (e.g., radio frequency ID (RFID), ultrawideband (UWB), Bluetooth low energy (BLE), etc.) infrastructure makes a large number of applications both practically realizable and economically compelling, unlike conventional approaches.

FIG. 1 is a block diagram of exemplary material monitoring system 100 in accordance with one embodiment. Monitoring system 100 includes interrogator/reader 110 and object 130, which includes monitoring tag device 120. In one embodiment, monitoring tag device 120 is embedded in object 130. Monitoring tag device 120 is configured to monitor characteristics and features of object 130. In one embodiment, the characteristics and features are associated with material properties of object 130. In one exemplary implementation, the characteristics and features include parameters associated with the object 130. It is appreciated there are various different parameters that can be sensed (e.g., temperature, dielectric constant, etc.). In one embodiment, monitoring system 100 includes collection component 125 (e.g., wick, etc.) configured to assist in collection and conveyance of indications (e.g., water, force, etc.) of the characteristic (e.g., moisture, pressure, etc.) to the sensing component.

FIG. 2 is a block diagram of exemplary monitoring system 200 in accordance with one embodiment. Monitoring system 200 includes interrogator/reader 210, monitoring tag device 220, and object 230. In one exemplary implementation, monitoring tag device 220 is coupled to the surface of object 230. In one embodiment, monitoring tag device 220 is similar to monitoring tag 220 (e.g., monitors characteristics, features, and parameters associated with material properties of an object, etc.). In one exemplary implementation monitoring system 200 includes collection component 225 (e.g., wick, etc.).

FIG. 3 is a block diagram of exemplary monitoring system 300 in accordance with one embodiment. Monitoring system 300 includes interrogator/reader 310, monitoring tag device 320, and object 330. In one exemplary implementation, monitoring tag device 320 is located in close proximity to the surface of object 330. In one embodiment, close proximity is within sensing distance of the sensor. In one exemplary implementation, sensing heat is within a couple of millimeters and sensing index of refraction is a few centimeters, and so on. In one embodiment, monitoring tag device 320 is similar to monitoring tag 120 (e.g., monitors characteristics, features, and parameters associated with material properties of an object, etc.).

FIG. 4 is a block diagram of an exemplary monitoring tag device 400 in accordance with one embodiment. Monitoring tag device 400 includes sensor component 410, controller component 420, power component 440, wireless communication antenna 450, and housing 490. In one embodiment, sensor component 410 is communicatively coupled to controller component 420 which in turn is communicatively coupled to wireless communication antenna 450. Power component 440 is electrically coupled to control component 420 and power component 440. Power component 440 provides power to the other components, including sensor component 410, controller component 420, and wireless communication antenna 450. In one embodiment, power component 440 harvests power/energy (e.g., from an external source, from motion, etc.). In one embodiment, power component 440 stores energy. Sensing component 410 senses parameters associated with material properties of an object. Wireless communication antenna 450 communicates information associated with the parameters sensed by sensing component 410. Control component 420 controls sensor component 410 and wireless communication antenna 450. In one embodiment, monitoring tag device 400 is similar to monitoring tag device 120, 220 and 320.

In one embodiment, a monitor tag includes an electronic circuit that is coupled to a wireless communication unit/component (e.g., a transceiver, communication antenna, similar to controller component 420, etc.) put in a housing material (e.g., plastic, PPT, etc., etc.) called an inlay and a housing cover is put on. In one exemplary implementation, the electronic circuit includes a die (e.g., formed in a small piece of silicon substrate, sensor die, etc.). The die can include portions of a control component.

It is appreciated that the overall configuration of a monitor tag device can be varied to suit a particular object device or a plurality of object devices (e.g., type of objects, set of objects, manufacturing batch of objects, etc.). A monitor tag device can have different shapes and sizes/dimensions. In one embodiment, a monitor tag device is similar to a standard RFID tag size range, 90-95 mm by 27-30 mm by 90-110 microns thick, and so on. In one embodiment, a monitor tag device has a similar size to a band-aid and includes a protection film over an adhesive layer so that unintended items are not stuck to the monitor tag device. The protection film can be removed/pulled back to expose the adhesive layer and used to couple the device monitor tag to an intended surface of an object. The adhesive or sticky portion is referred to as wet and without adhesive or sticky portion is referred to as dry. A monitor tag device/inlay/label with adhesive or sticky portion is referred to as a wet monitor tag device/inlay/label and without adhesive or sticky portion is referred to as a dry monitor tag device/inlay/label.

In one embodiment, a monitor tag device (e.g., 135 mm long by 35 mm wide by 5 mm thick, etc.) is configured to be mounted onto a metal tool. In one exemplary, a monitor tag includes a ceramic housing with an insulator layer (e.g., allowing the metal to act as a back plane to the antenna, can receive a signal on the metal, etc.).

The housing inlay can include plastic material (e.g., PPT, etc.) and the housing cover can include vinyl material. The housing cover can act as a label and include readable information (e.g., human readable, machine readable, etc.). The readable label can convey various types of information associated with the monitor device tag (e.g., indicate parameters/characteristics that are monitored, indicate sensors included in the tag, monitor tag device functionalities, an identification/registration number, production date, etc.). In one embodiment, the information on the label acts as a check/validation of information received via the wireless communication from the monitor tag device. In one exemplary implementation, a reader/interrogator can scan a bar code on the monitoring tag device and check it against information received via the wireless communication from the monitor tag device (e.g., to confirm correct/intended device, confirm wireless communication is working properly, etc.).

In one embodiment, a monitor tag device is configured in accordance with various desirable traits (e.g., flexible, rugged, corrosion resistant, etc.). In one exemplary implementation, ruggedness of a monitor tag device is increased by changing the configuration (e.g., increasing the size of a monitor tag device, changing the material of the housing, etc.). In one exemplary implementation a ruggedized monitor device tag has a ceramic housing and the size is slightly smaller than a dime face but thicker, 5 millimeters (mm) by 9 mm by 13 mm, and so on.

The housing is small/compact. In one exemplary implementation, a monitor tag has a surface area of approximately 90-95 mm by 27-30 mm and a thickness of 90 to 110 microns. In one embodiment, a monitor tag includes flexible components (e.g., electrical line traces, the housing material, etc.). In one exemplary implementation, and a monitor tag device housing material has an elasticity similar to plastic (e.g., PPT, etc.).

In one embodiment, a monitor tag device monitors many different functionalities/characteristics. It is appreciated a monitor tag device can have various different sensor configurations. In one embodiment, different types of sensors can monitor the same characteristic. In one embodiment, temperature is a characteristic that is monitored. In one exemplary implementation, temperature is monitored using a sensor that includes an antenna (e.g., variable resonance antenna structure, a resonant antenna structure, etc.). In one exemplary implementation, temperature is monitored using a sensor that includes a thermistor (e.g., with a Wheatstone bridge circuit, etc.). It is also appreciated that different types of sensors can be used to monitor different characteristics. In one embodiment, strain is characteristic that is monitored. In one exemplary implementation, strain is monitored using a sensor that includes a capacitive component (e.g., interdigitated capacitor, microelectromechanical (MEMs) capacitor (e.g., etc.). In one embodiment, a sensor can monitor magnetic fields.

The following table is a partial non-exhaustive listing of sensor types compatible with monitoring tag devices and corresponding parameters/characteristics monitored.

| Monitored Parameter/ Characteristic | Sensor Type |
| --- | --- |
| Temperature | thermistor or Wheatstone bridge |
| Strain | piezoelectric strain gauge |
| Index of Refraction, Qualitative | resonant antenna or capacitor |
| Moisture | resonant antenna or interdigitated capacitor |
| Relative humidity | temp plus moisture (e.g., thermistor or Wbridge and resonant antenna or interdigitated capacitor, etc.) |
| Motion | MEMS accelerometer |
| Absolute Index of Refraction | Fixed Capacitor and Variable Capacitor (look at ratio and get unique indication for refractive index of the material) |
| Light | A reverse biased PN junction |
| PH level | PH sensor - electrical conductivity/ion sensor |
| Pressure | piezo or pressure MEMS |

In one embodiment, sensing/monitoring a characteristic includes sensing a parameter and correlating the parameter to a characteristic. In one exemplary implementation, the parameter is associated with a material property. In one embodiment, an antenna sensor is used to sense a complex dielectric constant that is correlated with moisture. In one embodiment, in addition to detecting the presence of moisture the sensor monitors moisture quantity variations overtime, unlike traditional limitation of just detecting a binary moisture presence at a particular threshold level or not. In one embodiment, rate/acceleration of change of a characteristic is monitored by using the multiple variations measured over time. In one embodiment, a resonant antenna sensor detects characteristics in signal loss (e.g., detects the direction of movement on an S chart, etc.) and corresponding effective index of refraction changes in a material close to the resonance which in turn is correlated to a characteristic of the material (e.g., moisture, temperature, etc.).

In one embodiment, a sensor die senses/measures characteristics/parameters and associates the measured value with a sensor code value (also known as s-code, SCDE, etc.). The sensor code can be transmitted to a remote component (e.g., reader, interrogator, etc.). The sensor code can be stored in the monitor tag device.

In one embodiment, a monitor tag device is located within a chemical reaction of an internal material of an object and detects/senses a fundamental change. Information regarding the chemical reactions can be observed externally/remotely (e.g., by a reader/interrogator, a remote system, etc.). In one exemplary implementation, electronics of the material changing over time are monitored (e.g., obtain external/remote insight into the internal material property/chemical changes, etc.)

In one embodiment, a monitor tag device can observe a concrete cure in ways unlike traditional approaches. In one exemplary implementation, the cure process of concrete, also called the hydration process, can be directly tracked by measuring the in-situ temperature and electronic properties of the concrete duration hydration. The conventional method of approximating the hydration process of concrete is called the "maturity" model. This traditional model is empirical and based upon several fitting parameters. By contrast, the use of embedded sensors avoids the use of multiple fitting parameters by directly measuring the physical changes in the concrete. In one embodiment, a measurement is not a structural measurement.

In composite materials the underlying bond states of a glue/resin (e.g., is it solid, how much bond linking has occurred, a percentage cured, etc.). In one exemplary implementation, sensors can be used to directly observe the evolution of epoxy during the cure process. By tracking both the temperature and electronic state of the epoxy, or epoxy-filled material in the cases of Kevlar, fiberglass or Carbon Fiber, many properties of the cure are directly observed, including how exothermic the reaction is, the time to peak temperature, the chemical change from the liquid to solid state of cure, and the degree of crosslinking developed during the cure or within an optional post bake process, and so on.

FIG. 5 is a flow chart of an exemplary monitoring tag method 500 in accordance with one embodiment. Monitoring method 500 monitors variations in an internal material property of an object. In one embodiment, the process/method does not necessarily have to follow in an ordered sequence from block 510, 520, 530, and so on. In one embodiment, the process/method blocks can occur in a different order and include returns/jumps to other blocks. In one exemplary implementation, monitoring tag method 500 involves sequences of reading information from a monitor tag device. In one embodiment, the timing/sequence of performing a monitor tag reading/read rates can vary (e.g., tens of milliseconds, hundreds of milliseconds, one to three milliseconds, etc.) depending upon different factors (e.g., how many parameters/characteristics are being sensed, the types of sensors, the version of a monitor tag device, etc.). In one embodiment, the intervals between read cycles can also vary (e.g., less than a second, a minute, days, years, etc.) and can change depending on whether being read as part of an object manufacturing process or part of use of the object in the field.

In block 505, a monitor tag is powered up. In one embodiment, energy is optionally harvested (e.g., from an externally generated signal, motion, etc.). In one embodiment, energy is provided from an energy storage component included a monitor tag device (e.g., battery, capacitive storage, etc.). In one exemplary implementation, energy is supplied from a source external to the monitor tag device.

In block 510, variations in a parameter/characteristic over time are sensed, wherein the characteristic is related to an internal material property of an object and the variations are sensed from within the object. In one embodiment, the characteristic is related to a parameter associated with the material property. A plurality of data points can be collected and the plurality of data points correspond to the sensing of the characteristic. The material properties can be related to a composite material. In one exemplary implementation, the characteristic is one of a plurality of characteristics sensed, and the sensed variations are associated with a plurality of various material characteristics inside the material.

In block 520, information on the variations in the parameter/characteristic from within the object is communicated to a remote component, wherein the communication is wireless.

In block 540, variations in the parameter/characteristic are optionally mapped to physical properties of the material.

In block 550, analysis is optionally performed on the information. In one embodiment, a visual representation of the characteristic being sensed over time is presented. The visual representation can include images (e.g., graphics, a video, a table, a graph, etc.) presented on a display. In one embodiment, presentation of the information can include audio.

In one embodiment, the object includes a composite material and the monitoring tag device monitors parameters associated with material properties of composite materials. The composite material includes two or more distinct constituent materials. The constituent materials include a matrix binding material and a reinforcement material. A mold is used to configure the composite materials in the form/shape of an object. The reinforcement material is placed on the surface of the mold or into a cavity of the mold. The matrix bonding material is brought into contact with the reinforcement material and a melding process amalgamates the matrix bonding material and reinforcement material into the object in a desired form/shape with desired characteristics. In one exemplary implementation, there is a melding event that triggers or initiates a melding process that amalgamates the matrix bonding material and the reinforcement material. In one embodiment, the resultant object and composite material has desirable physical (e.g., low weight, high strength, etc.) or electrical/electronic properties.

In one embodiment, a monitoring tag device provides relatively continuous monitoring related information/data points. In one exemplary implementation, monitoring related information/data points are provided in very short intervals and at a rapid rate. In one embodiment, monitor tag device tracking can be several minutes long and a monitor tag device can read once a second. In one exemplary implementation, a monitor tag device sensor delivers several thousand data points throughout a process. In one embodiment, a unique reading process allows read rates approaching 1000/sec. As a practical matter, a monitor tag device meaning can track "real-time" events with quite short timeframes. In one exemplary implementation, a fast strain tag in the propeller of an airline can track the changing deflection of the blade of the propeller as it rotates. In one embodiment, the nominal RPM for a fixed RPM propeller is 2300 RPM, means that a single rotation takes ~25 ms, and a monitor tag can detect the strain state of the propeller 25 times during a single arc.

In one embodiment, the information/data points are analyzed on a relatively continuous basis and various actions regarding the object (e.g., associated with object creation, object use, etc.) are implemented. In one exemplary implementation, an automatic action/adjustment in an object fabrication process (e.g., remove from mold, begin/stop a dill press, etc.) is implemented based upon information sensed by the monitor tag device. In one exemplary implementation, an automatic action/adjustment in use (e.g., change spin rate/pitch angle of a wind turbine blade, adjust speed of a vehicle with a wing that includes a monitor tag device, etc.) is implemented based upon information sensed by the monitor tag device.

In one embodiment, a monitor tag device enables a coordinated collection and analysis of multiple different sensed values (e.g., values from multiple different or similar sensors, values associated with multiple different parameters/characteristics of the internal material properties, values associated with internal material properties and external conditions, etc.). In one exemplary implementation, the analysis includes analyzing/comparing an aspect (e.g., threshold, change rate, change acceleration, etc.) of a first parameter/characteristic in relation to/versus an aspect (e.g., threshold, change rate, change acceleration, etc.) of a second parameter/characteristic. In one embodiment, multiple sensors sense parameters/characteristics substantially simultaneously (e.g., before too much time passing between sensing causing a correlation between the parameters/characteristics to be become irrelevant, etc.).

The rapid collection and analysis of presented novel monitoring tag device approaches enable appropriate, efficient, and effective reactions that were not traditionally humanly possible. While some traditional machine/computer assisted approaches may have offered some improvement over pure human capabilities, the traditional machine/computer assisted approaches had many limitations (e.g., limited to sensing one parameter/characteristic, limited to single binary indications associated with single threshold/state, limited to a single reaction to the sensed information, etc.) and detrimental impacts. In many traditional manufacturing processes (e.g., many large-scale manufacturing processes, etc.) are essentially running blind in many situations (e.g., there are only guesses about what is going on, etc.) making control problematic and difficult (e.g., whether human, traditional machine based, etc.).

In one embodiment, the presented novel monitoring tag device approaches provide efficient and effective information that enable multi-parameter/multi-characteristic sensing, multiple data points/indications associated with multiple thresholds/states, and multiple reactions based upon the sensed information.

In one embodiment, a direct indication/measurement of actual changes internally in an object rather than unlike traditional approaches relying primarily on estimates/conjectures/and so on. In one exemplary implementation, multiple sensors can sense parameters/characteristics in different areas/depths/layers of the object.

In one embodiment, a monitor tag device is securely coupled to the surface of an object and providing valuable sensed related information for a first activity and conveniently/selectively removable for a second activity. In one exemplary implementation, a monitor tag is coupled to the leading edge of a wind turbine wing portion for a manufacturing activity (e.g., providing information during curing and mold removal, during initial spin testing, etc.) and removable before use in the field (e.g., so as not to interfere with wind dynamics/efficiency, not attract lighting strike, etc.).

Figure 6:
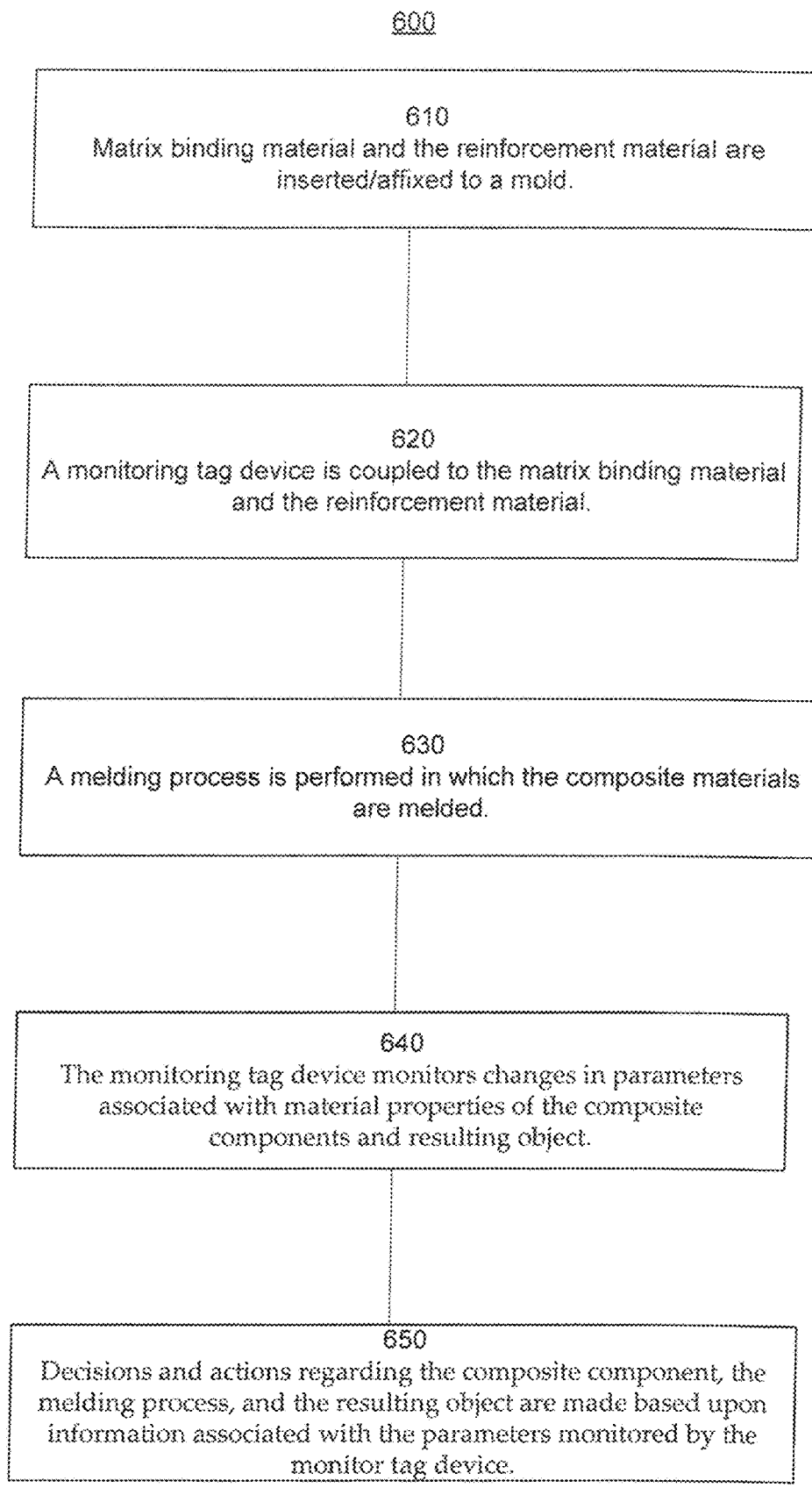
FIG. 6 is a flow chart of a composite object monitoring method in accordance with one embodiment.

FIG. 6 is a flow chart of a composite object monitoring method 600 in accordance with one embodiment. In one embodiment, the process/method does not necessarily have to follow in an ordered sequence from block 610, 620, 630, and so on. In one embodiment, the process/method blocks can occur in a different order and include returns/jumps to other blocks.

In block 610, matrix binding material and the reinforcement material are inserted/affixed to a mold.

In block 620, a monitoring tag device is coupled to the matrix binding material and the reinforcement material. In one embodiment, a sensor of the monitoring tag is initially coupled to one of the composite components (e.g., matrix binding material and the reinforcement material, etc.) and subsequently coupled to the other composite component.

In block 630, a melding process is performed in which the composite materials are melded. In one embodiment, the melding process results in the formation/creation of an object. In one exemplary implementation, the form/shape of the object corresponds to the mold.

In block 640, the monitoring tag device monitors changes in parameters associated with material properties of the composite components and resulting object. In one embodiment, the monitoring tag device monitors parameters before, during and after a melding of the matrix binding material and the reinforcement material into an object. The monitoring tag can be configured to monitor various aspects of the melding.

In block 650, decisions and actions regarding the composite component, the melding process, and the resulting object are made based upon information associated with the parameters monitored by the monitor tag device. In one embodiment, adjustments to the molding process and when to remove an object from a mold are made based upon information from a monitor tag.

It is appreciated composite material objects can be created by various processes (e.g., fabrication, manufacture, construction, etc.) and utilized in different applications (e.g., transportation vehicles, infrastructure and construction structures, power generation equipment, manufactured products, etc.).

The composite industry has made progress in improving the manufacturing processes, however, traditionally that progress is largely constrained to trying a different physical set up or process, and then inspecting the outcome of the change afterwards. While this may have some merit, it can be extremely wasteful if the outcome is not within desired objectives. The traditional lack of practical and economically viable insight to internal characteristics means that there is often little direct understanding of the material properties/processes during the manufacturing process.

Control and understanding are dramatically improved by utilizing the novel monitor tag devices presented herein to understanding what is happening to internal characteristics of an object (e.g., during the composite process, during use, etc.). An understanding of what is happening during the composite process allows, for the first time, the ability to modify the manufacturing/composite process based upon live data in real time. In addition, it allows the process designer to directly test process hypotheses in real time. In many ways, understanding the real-time data of a composite process fills in the unknowns between process modeling and reality. In one embodiment, insight to information associated with actual measurements that was previously basically unknown is realized (e.g., in epoxy processes the gap between sealing the mold and testing of the final product, in concrete pours the gap between filling a form and use of the structure, etc.). The world of statistical process control (SPC, six-sigma, blackbelts, etc) is predicated upon direct process measurements and a monitor tag device system does enable the implementation of SPC in a way not conceptualized before for large scale manufacturing.

Fibrous Process and Material

One class of composites combine a fibrous material (e.g., Kevlar, carbon fiber, fiberglass, wood, aramid, boron, etc.) and a polymer matrix material. In one embodiment, combining with a polymer matrix material includes infusing the fibrous material with thermoset resin (e.g., polyester, epoxy, vinyl ester, phenolic, polyurethane, etc.). In one embodiment, a general infusion process involves a mold which defines the shape of an object and the polymer matrix material is infused with the thermoset resin inside the mold. In one embodiment, various reinforcement materials (e.g., fibrous material, additional pre-assembled parts, etc.) are combined within the mold and operate as building blocks of the object. A variety of additional pre-assembled parts (e.g., balsa wood cores, Styrofoam rib, etc.) can be used to achieve various results (e.g., increase local strength, define cross section shape, etc.). The additional pre-assembled parts are often referred to as the "layup". In one exemplary implementation, after the constituent parts are carefully assembled inside of the mold, the mold is sealed.

In one embodiment, an epoxy process is initiated and epoxy resin is introduced into the mold. When the process is designed correctly, the epoxy flows throughout spaces in reinforcing materials, free of any voids. In one exemplary implementation, some of the epoxy resin penetrates into the reinforcement materials (e.g., is absorbed, diffuses, etc.). The epoxy resin flow process should be completed during the liquid period of the epoxy process. In one exemplary implementation, even when the epoxy resin appears to completely fill the mold, the epoxy process often continues epoxy resin flow to eliminate air bubbles and achieve consistency in the epoxy. In one embodiment, the flow ceases when the epoxy enters the initial cure, or "green" phase and transitions from a liquid to a gel state.

In one embodiment, as the epoxy begins the cure process, the local temperature of the object rises due to the exothermic nature of the cure. At some point, portions of the epoxy resin and reinforcement fibers harden into combined solid state. The heat generated by the cure slows as the epoxy approaches the solid state, with the peak temperature generally occurring around the time that the epoxy enters the solid phase of the cure.

In the world of epoxy, the term glass transition is typically used to describe the softening of the solidified epoxy as the temperature increases. A higher transition temperature indicates that the epoxy is stable to higher temperatures. To improve the glass transition temperature, or Tg, of an epoxy, manufacturers often elevate the temperature of the object during the cure process or after the epoxy has cured to being a solid. The characteristics of the epoxy change during this thermal "soak", generally increasing the glass transition temperature. Finally, the part is allowed to cool until it is practical to take the part out of the mold. A novel monitor tag device approach described herein provides valuable insight to temperature changes (e.g., elevation, cooling, thermal gradient, etc.) of the materials.

FIG. 7 is a flow chart of exemplary epoxy process 700 in accordance with one embodiment. In one exemplary implementation, the process proceeds through steps in an order and critical parameters are tracked. In one embodiment, the process is in general a vacuum assisted procedure. In one embodiment, the process/method does not necessarily have to follow in an ordered sequence from block 710, 720, 730, and so on. In one embodiment, the process/method blocks can occur in a different order and include returns/jumps to other blocks.

In block 710, tags and sensors are placed in position. In one embodiment, tags and sensors are placed in the mold.

In block 720, fibers are placed in a mold. It is appreciated various type of fiber can be used (e.g., fiber glass, carbon fiber, etc.).

In block 730, a mold is evacuated. In one exemplary implementation, the mold is evacuated repeatedly. The repetition of applying vacuum, then allowing a partial or total ingress of gas, and repeating, has the result of compacting the fibers. Being able to measure the density of the fibrous material during this phase is a critical parameter. In addition, some of the materials may contain moisture, thus being able to detect the reduction of moisture levels during the vacuum process is also critical.

In block 740, resin is added. In one embodiment, the epoxy valves are opened, and resin is allowed to flow into the mold. It is therefore important to understand the specifics of the resin movement. In one embodiment, the sensors and tags collect information on critical parameters associated with the resin movement (e.g., resin detection, resin flow speed, direction/velocity vector, etc.).

In block 750, a monitoring process is performed utilizing a monitoring tag device. It is appreciated the monitoring process can be initiated at various points associated with blocks 710, 720, 730, 740, and so on. (e.g., concurrently with a block, in the epoxy process, etc.). In one embodiment, the monitoring process begins after block 720.

In block 770, adjustments in epoxy process and environmental controls are selectively made based upon information obtained from the monitoring process. The adjustments can have a direct or indirect impact on the epoxy process. In one embodiment, aspects (e.g., curing, strength of the object, etc.) of the epoxy process are speeded up/slowed down. In one embodiment, an environmental control adjustment is made to the mold based on external control system (e.g., temperature control system, moisture control system, pressure control system, etc.) coupled to the mold which in turn causes adjustments in the epoxy process. In one embodiment, a monitoring tag device monitors internal effect due to external interactions with an object (e.g., external heat, force, etc.)

In block 790, the epoxy process is ended and the object is removed from the mold. In one embodiment, the monitoring process of block 750 continues to be selectively performed on the object. In one embodiment, by using multiple monitor tags thermal gradients can be mapped during cure and the thermal gradients can cause strain (which can also be monitored) to be "baked" into the final structure.

It is appreciated a monitor tag device can be utilized to collect information on various parameters associated with material properties. The parameters can include critical parameters, packing density, moisture and temperature of the packing materials, epoxy presence, epoxy temperature, epoxy cure state, strain, and assessment of gel and solid stages, epoxy flow velocity (speed and direction), and epoxy Tg increase and saturation, and so on. Most of these parameters can be collected in a process involving resin transfer molding and vacuum assisted resin infusion. In one embodiment, once the epoxy resin has been distributed throughout the interior of the mold, critical parameters can include epoxy cure state and temperature. During a thermal soak the critical parameters can include the epoxy cure temperature and progress of the epoxy material toughening. Specifically, if heating is applied to the part to increase Tg of the epoxy, this thermal soak period can be terminated when Tg has stabilized. Following the thermal soak, critical parameters include temperature, as this tells the operator when the finished object/part can be taken from the mold.

Traditional manufacturing quality controls depend upon monitoring the inputs to a manufacturing process and detecting quality issues post-manufacturing. In composite manufacturing this conventionally becomes a question of how to monitor the quality of incoming materials and of detecting structural issues post-manufacturing. In this case, a key component is the quality and chemistry of the resin components. However, most traditional composite manufacturers do not have an independent method of verifying the performance of this critical component. Indeed, it is quite common to hear manufacturers express frustration with a "bad batch" of resin, but only after having ruined parts by using a bad batch of resin. Traditionally, sensors currently used in the composite world, using wires and batteries and optical fiber devices are unwieldy and expensive.

In one embodiment, the wireless unit communicates information to a remote reader/interrogator that is operable to perform operations on the data. In one embodiment, a monitor tag control component also includes some processing capabilities. In one exemplary implementation, the control component comprises a memory information storage component and the control component is operable to participate in forward error correction. In one embodiment, a control component includes a memory that stores various information related to a monitor tag device (e.g., information related to: identification, maintenance, manufacturing process, constructions process, object performance, read history, indication of additional remote information storage, etc.).

Again, it is appreciated the novel presented monitoring tag devices can monitor changes in various parameters.

Density

In one embodiment, density of a material in an object is an important characteristic. Density of a material typically has a significant impact on various things, including the structural strength, penetrability (e.g., by light, electrical signals, radiation, soundwaves, etc.), and so on. In one embodiment, materials included in an object are packed together forming a material density.

In one embodiment, a density of fibrous material packed in a mold is referred to as the packing density. In some cases, a mold is evacuated and infusions of epoxy resin to create an object are done under vacuum, causing the compression of the materials within the mold. The evacuation of the mold and resulting vacuum cause the inner materials of the object to compress and become denser. In one embodiment, a tag sensor is used to monitor the compression and resulting density of the material (e.g., fibrous material, epoxy resin, etc.) used to create the object.

In one embodiment, a tag sensor is sensitive to a complex dielectric constant, which changes as the material (e.g., fiber, epoxy resin, etc.) compresses and becomes denser. It is well known in the industry that these materials can compress more if the mold is repeatedly taken to a vacuum state. However, accurately realizing when material in an object has reached a desired density has traditionally been very problematic and impractical, without a reasonably reliable indication of when a desired density is reached. Conventional approaches typically did not reach desired density or wasted a lot of time and resources repeating multiple evacuation/compression cycles beyond what is needed. Unlike the conventional approaches, a tag monitoring device can accurately provide information related to material properties in an efficient and practical manner.

Moisture and Temperature of the Packing Materials

Many of the materials used in the composite materials can absorb water. The inclusion of water during a composite process can cause material defects. The presence of water changes the permittivity of the packing materials. In one embodiment, a tag sensor can detect changes in the permittivity associated with the moisture and provide an indication of the moisture level within the mold. More specifically in one exemplary implementation, water outgassing causes the overall moisture level to decrease which is similarly tracked by the tag sensor.

Figure 8:
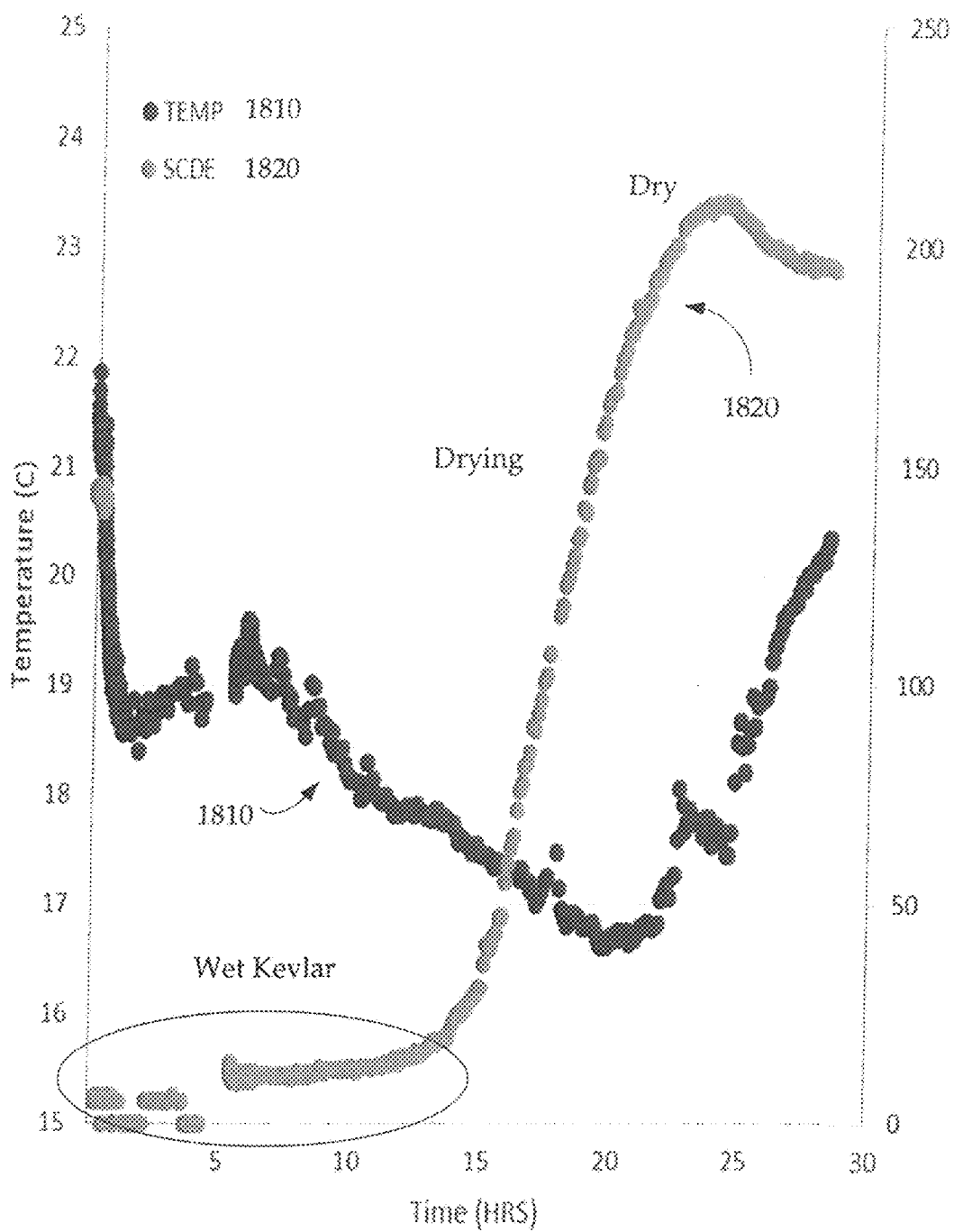
FIG. 8 is a graph illustrating exemplary tracking of wetness of Kevlar in accordance with one embodiment.

FIG. 8 is a graph of illustrating exemplary tracking of wetness of Kevlar in accordance with one embodiment. Curve 1810 is associated with temperature changes that initially curve down and then up and curve 1820 is associated with SCDE changes that are initially relatively flat then curve up. At the beginning of this graph time zero, the Kevlar is saturated with moisture. At about 5 minutes, the standing water is removed leaving a saturated set of Kevlar layers. Over the period of a day, the moisture level is tracked as the Kevlar dries out.

In one embodiment, the temperature of the packing materials is similarly tracked.

Epoxy Presence

Epoxy resin has a different complex dielectric constant than common packing materials, including balsa, fiberglass, Kevlar, carbon fiber, or air (vacuum). The response of the sensor will clearly change when the epoxy resin reaches the sensor. Thus, the sensor shows epoxy arrival time, flow pattern cure state, and so on.

Epoxy Temperature

In one embodiment, the curing process of epoxy is exothermic, producing heat. In one exemplary implementation, each sensor records the local temperature during the curing process, allowing the operator to know the temperature, know when the temperature of the cure process has reached its maximum, and when the mold is cool enough to begin the demolding process.

Epoxy Cure State and Assessment of Gel and Solid Stages.

As epoxy cures, the curve of complex dielectric constant vs. time undergoes inflection points. These inflection points are correlated to the epoxy moving from the liquid to gel state and transitioning from the gel to solid state. Thus, the sensors can directly report the transition time from liquid to gel to solid states. It should be noted that because of the specifics of the various materials, the specifics of the curves will vary dependent on the material set.

Figure 9:
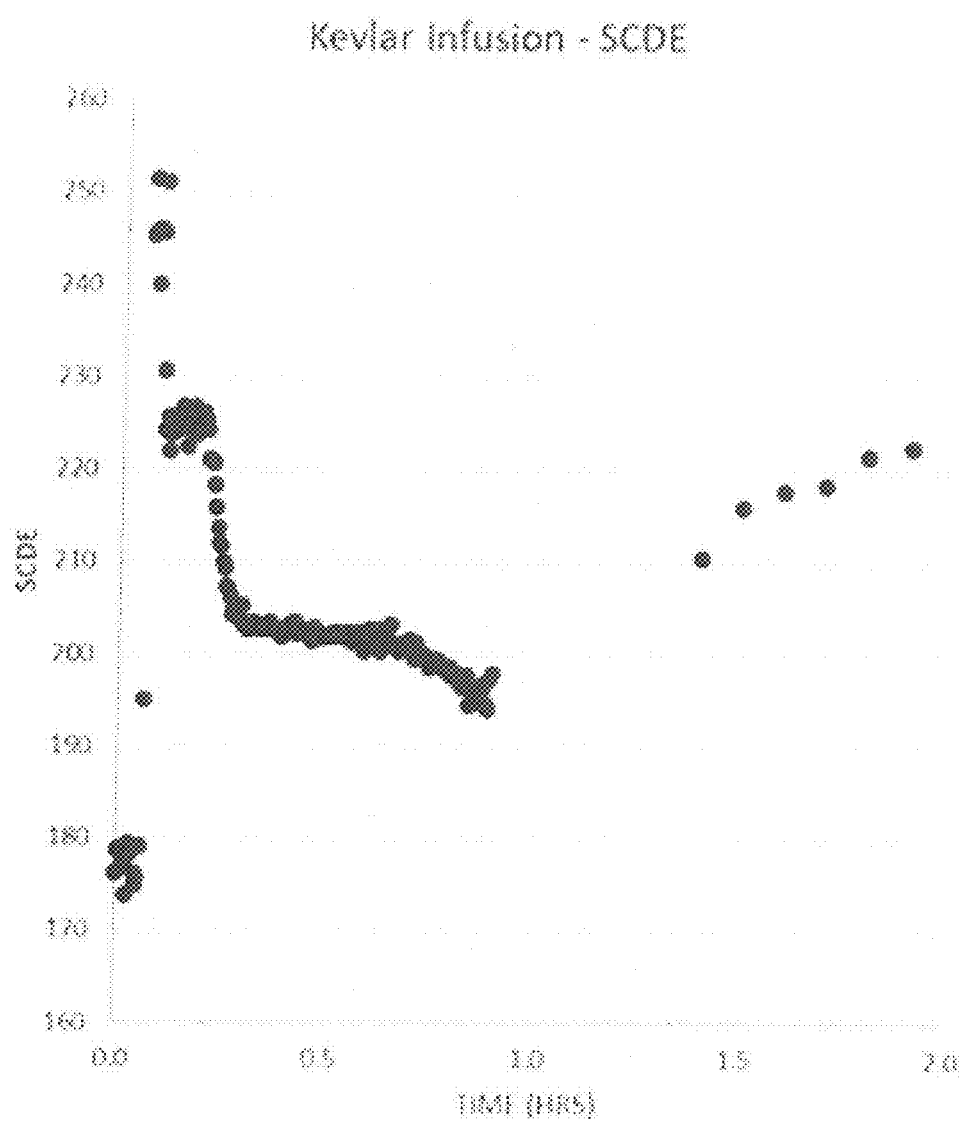
FIG. 9 is a graph of an exemplary sensor code and temperature profiles in accordance with one embodiment.

FIG. 9 shows an exemplary graph of sensor code and temperature profile capabilities in accordance with one embodiment. The arrival of epoxy is clearly shown at ~0.1 hr. The graph illustrates a first inflection occurs at ~0.2 hour, as the transition to gel, and then at ~0.9 hour, as the epoxy enters the solid cure phase. In FIG. 9 starting at ~0.9 hour the graph indicates the gradual ascending SCDE. In one embodiment, the graph is an illustration of a close inspection of the SCDE parameter for a sensor in the center of layers of Kevlar. The SCDE rapidly increases when the epoxy enters, then enters a range of ~225, then to ~200, slowly curving downward. SCDE is seen to start to move back up. The sensor is off-line due to high temperature until ~1.3 hours. The gently increasing SCDE is indicative of the epoxy strengthening in the solid phase of the cure. In one embodiment, this is indicative of the epoxy strengthening and Tg increasing in the solid phase of the cure, and when SCDE ceases to increase over time the epoxy is fully cured.

Figure 10:
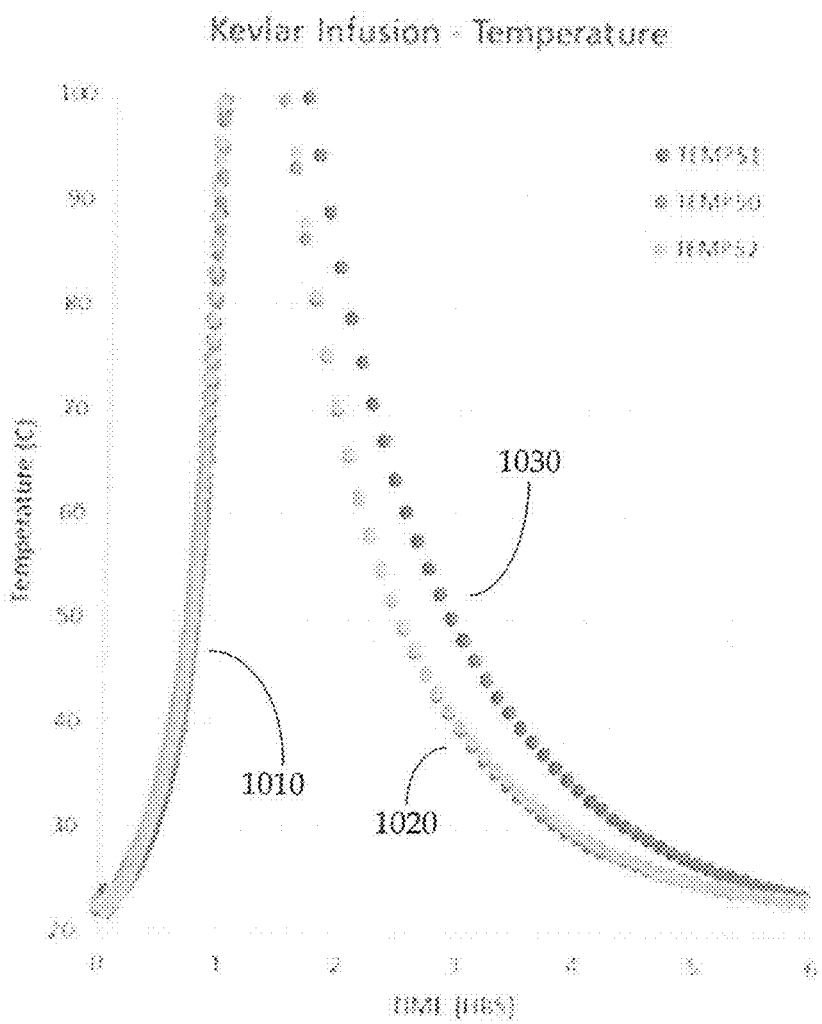
FIG. 10 is a graph of another exemplary temperature profiles in accordance with one embodiment.

FIG. 10 is a graph of exemplary sensor code and temperature profiles in accordance with one embodiment. The temperature profile capability of an exemplary monitor tag device is shown clearly in FIG. 10. In one exemplary implementation, the graph of a temperature profile of a Kevlar infusion is shown for 3 tags. The temperature begins increasing very early in the process and in section 1011 the data points for the three tag are close as they rise. The data points for two of the tags remain close in the decline section 1020 but data points from the third tag begin to deviate in section 1030 (e.g., move to the right) from the other two tags. In one embodiment, at just before 1 hour, the temperature exceeds 100 C and the sensor ceases to produce data.

Figure 11:
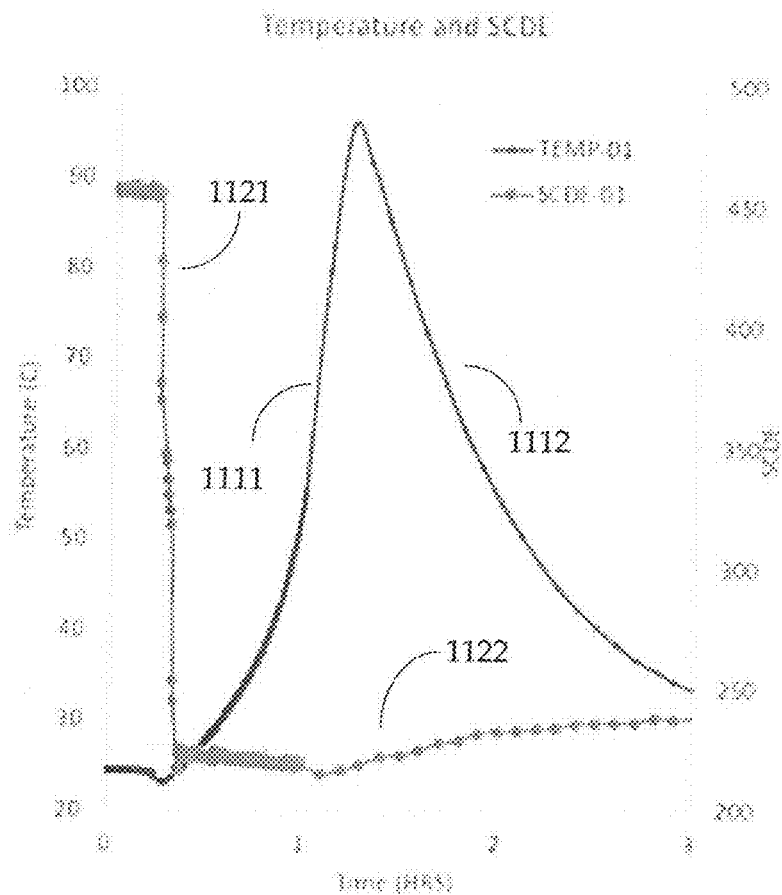
FIG. 11 is another graph of an exemplary sensor code and temperature profiles associated with tracking an infusion process for a Kevlar and Carbon Fiber composite structure in accordance with one embodiment.

FIG. 11 shows another exemplary graph of a temperature profile associated with tracking an infusion process for a Kevlar and Carbon Fiber composite structure in accordance with one embodiment. Another temperature profile capability of an exemplary monitor tag device is shown clearly in FIG. 11. The epoxy enters when the trace of temperature decreases and the arrival of epoxy is clearly shown at approximately ~0.3 hr. The temperature rises in section 1111 and descends in the section 1112. The graph of FIG. 11 shows the primary epoxy transition to a solid which is represented by the inflection point at about 1 hour, which also corresponds to the maximum observed temperature, which occurs shortly after the epoxy transition. This is the epoxy entering the solid cure phase and also starting at ~1 hour the +− gradually ascending SCDE. Initially the SCDE drops in section 1121 and then gradually ascends in section 1122.

Figure 12A:
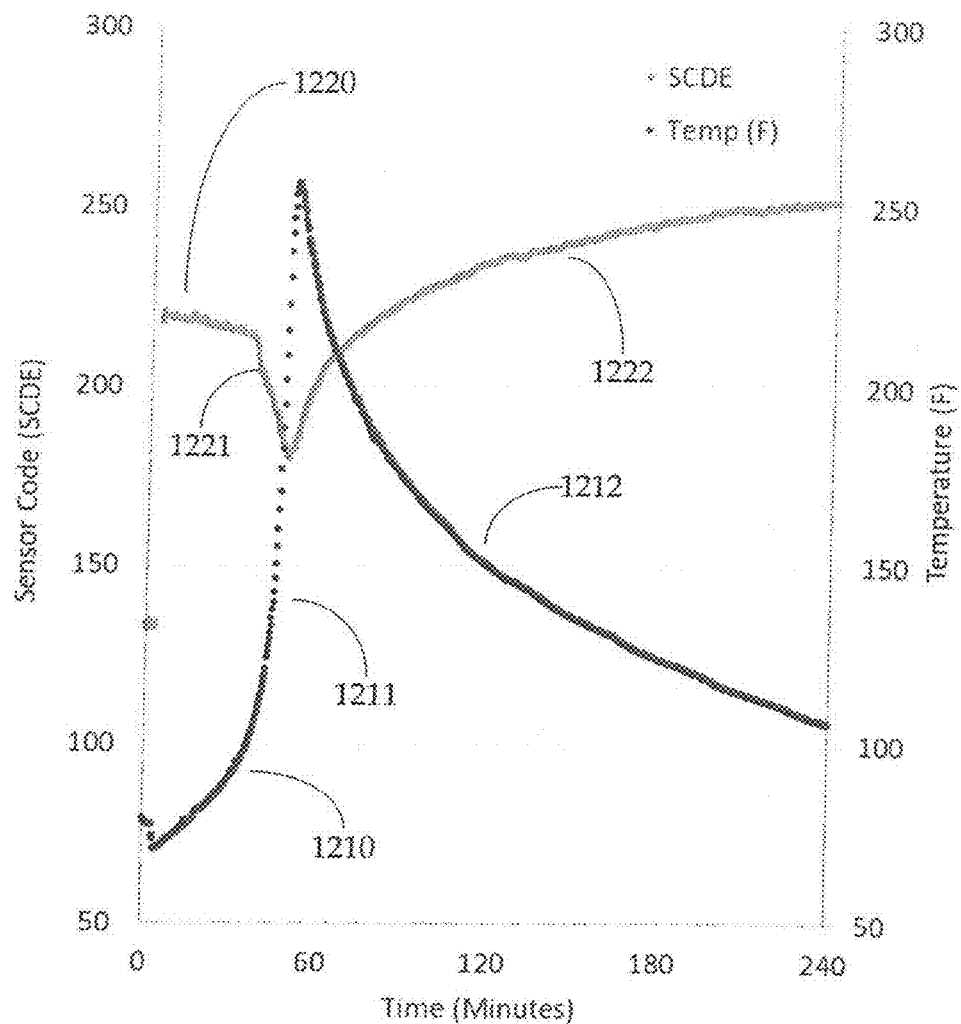
FIG. 12A is a graph of an exemplary sensor code and temperature profiles associated with a fiberglass/balsa/fiberglass layup composite structure in accordance with one embodiment.

FIG. 12 is an exemplary graph of sensor code and temperature profiles associated with a fiberglass/balsa/fiberglass layup composite structure in accordance with one embodiment. Temperature data points follow curve 1210 that increase in section 1211 and decrease in section 1212. SCDE data points follow curve 1220 that decrease in section 1221 and increase in section 1222. The arrival of epoxy is clearly shown at approximately ~20 minutes. The gradual increase of the transition temperature is reflected in the SCDE rising gradually over time. Starting at ~270 minutes, a gradual curve of ascending SCDE is shown, peaking at about 100 minutes, with the clear transition point to the solid phase also observed at approximately ~270 minutes.

Epoxy Tg Increase.

It is common in composite manufacturing to increase the temperature of the object/part after the object/part reaches the solid state of the cure cycle. This is done to increase the glass transition temperature, or Tg. The complex dielectric constant of cured epoxy is a function of Tg, thus the increase in Tg can be tracked in real time by the sensor. This is clearly demonstrated in multiple material systems in the figures, specifically the gradually increasing SCDE as the epoxy moves through the solid portion of the cure.

It should be noted that the data from multiple sensors can be combined to map the composite part, and to compute second order details, like thermal gradients during manufacturing or the velocity of epoxy flow.

Thermal Gradient

During the solid phase of the epoxy cure process thermal gradients can produce residual stress in the finished product. By utilizing multiple sensors in an appropriate pattern and measuring the local temperature at each sensor, a 3-D mapping of thermal gradients can be achieved.

Epoxy Flow Velocity (Speed and Direction).

In a system with multiple sensors in known positions, the arrival time of the epoxy at each sensor indicates the shape, speed, and direction of the epoxy flow field.

Monitoring Composite Structures Post Manufacturing.

Thus far, the description has focused upon being able to monitor the manufacturing process. However, sensors left inside of the composite part are sensitive to changes, potentially including air gaps, fractures, and the entrance of fluids (e.g., oil, water, etc.).

Figure 13:
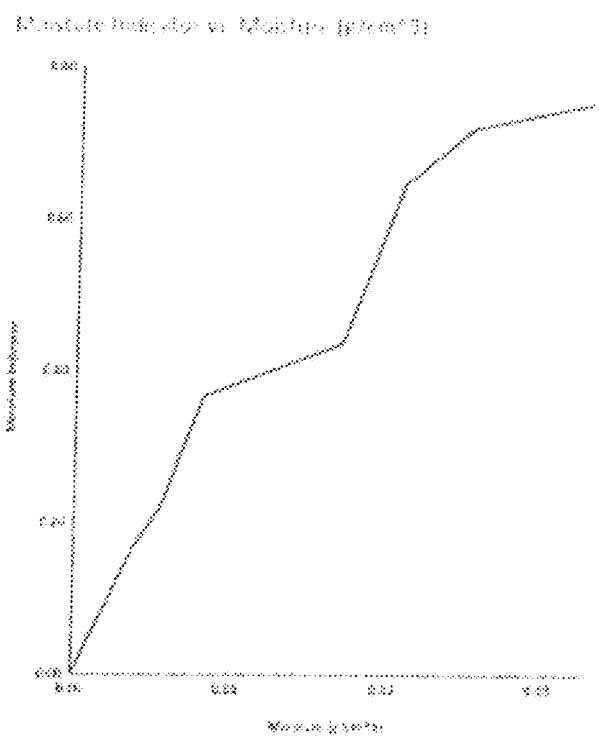
FIG. 13 is a graph illustrating exemplary monitoring results from a tag device monitoring a composite part that is experiencing the ingress of water over time in accordance with one embodiment.

FIG. 13 is a graph illustrating an example monitoring results from a monitor tag device monitoring a composite part that is experiencing the ingress of water over time in accordance with one embodiment. The monitoring tag device is placed between solid blocks of balsa. In one exemplary implementation, the blocks of balsa are covered on all sides by ~2 mm of epoxy. The unit is stored in water and periodically tested.

Figure 14:
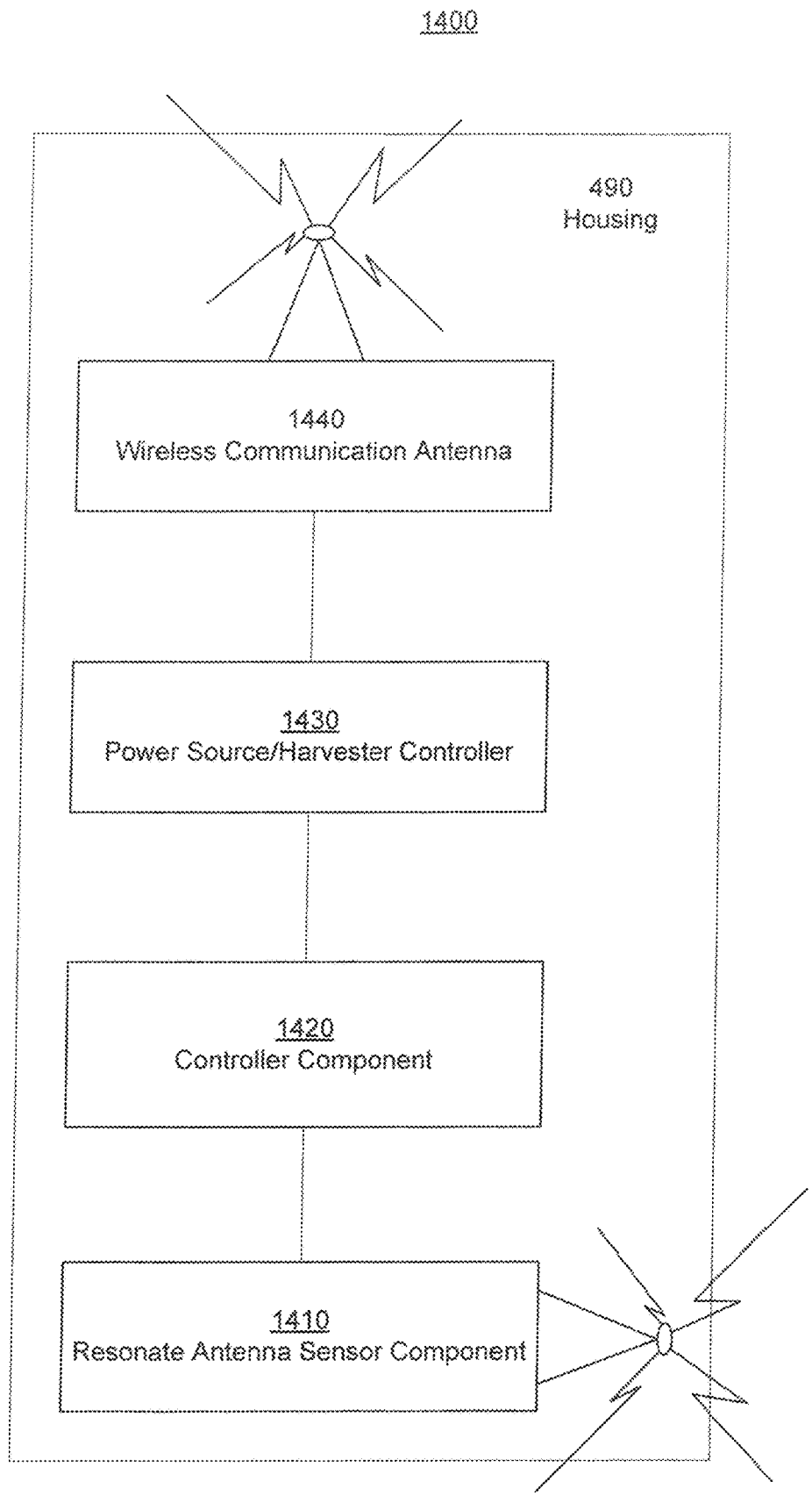
FIG. 14 is a block diagram of an exemplary monitoring tag device in accordance with one embodiment.

FIG. 14 is a block diagram of an exemplary monitoring tag device 1400 in accordance with one embodiment. Monitoring tag device 1400 includes resonant antenna sensor component 1410, controller component 1420, power component 1440, wireless unit/communication antenna 1450, and housing 1490. In one embodiment, sensor component 1410 is communicatively coupled to controller component 1420 which in turn is communicatively coupled to wireless communication antenna 1450. Power component 1440 is electrically coupled to and provides power to resonant antenna sensor component 1410, control component 1420 and wireless communication antenna 1450. In one embodiment, power component 1440 harvests power/energy from an external source. In one embodiment, power component 1440 stores energy. Sensing component 1410 sense parameters associated with material properties of an object.

Wireless communication antenna 1450 communicates information (e.g., associated with the parameters sensed by sensing component 1410, etc.) to a remote component. Control component 1420 interacts with resonant antenna sensor component 1410. Resonant antenna sensing component 1410 is configured to sense variations in a characteristic over time, wherein the characteristic is related to material properties of material in an object. Control component 1420 comprises an electronic component configured to recognize an indication of the variations in the characteristic over time. Wireless unit component 1450 is configured to communicate with a remote device, including transmitting information associated with the variations in characteristics. In one embodiment, monitoring tag device 1400 is similar to monitoring tag device 120, 220, 420, and so on.

In one embodiment, the characteristic can be related to various parameters (e.g., an index of refraction of the material, changes in permittivity/dielectric constant of the material, etc.). In one exemplary implementation, changes in a dielectric constant are associated with a parameter related to changes in the material properties of the object. In one embodiment, the resonant antenna is located within a portion of the material and the variations are associated with a material characteristic inside the material. The material properties can be related to a composite material (e.g., composite components, curing process, etc.). The variations can be associated with changes in the material properties (e.g., deterioration, wear, loss of calibration, etc.) resulting from use of the object. In one embodiment, the wireless unit can include a transceiver antenna that is separate from the resonant antenna. In one embodiment, the wireless unit includes a transceiver antenna that harvests energy from an externally generated electromagnetic signal.

FIG. 15 is an exemplary material internal property monitoring method 1500 in accordance with one embodiment. In one embodiment, the process/method does not necessarily have to follow in an ordered sequence from block 510, 520, 530, and so on. In one embodiment, the process/method the blocks can occur in a different order and include returns/jumps to other blocks.

In block 1505, a monitor tag device is powered up. In one embodiment, energy is optionally harvested (e.g., from an externally generated signal, motion, etc.). In one embodiment, energy is provided from an energy storage component included a monitor tag device (e.g., battery, capacitive storage, etc.). In one exemplary implementation, energy is supplied from a source external to the monitor tag device.

In block 1510, variations in a characteristic that affects a resonant antenna are sensed over time, wherein the characteristic is related to an index of refraction of the material in the object. In one embodiment, the characteristic is related to changes in permittivity/dielectric constant of the material. In one embodiment, a change in the dielectric constant is associated with a parameter related to changes in the material properties of the object. The resonant antenna is located within a portion of the material included in the object and the variations are associated with a material characteristic inside the material. The characteristic can be one of a plurality sensed characteristics.

In block 1520, information is communicated to and from a remote device wirelessly, wherein the information includes indications of variations in the characteristic. In one embodiment, the material properties are related to a composite material. The variations can be associated with changes in the material properties resulting from use of the object.

In block 1530, the information on the variations in the characteristic over time is mapped to a material property of the object.

In one embodiment, material internal property monitoring method 1500 includes an optional additional block 1550 of performing operations on the information. Variations associated with the index of refraction can be translated to a characteristic of the material. In one exemplary implementation modified data is presented in a visualization/report, wherein the modified data corresponds to results of performing operations on the information.

In one embodiment, a monitoring tag is utilized to monitor quality control of constituent materials input to a composite material process. In one exemplary implementation, resin quality verification is performed. A key component in the production of fibrous composites is the resin that is injected into the object/part. This resin cures within the manufacturing process, becoming a key part of the final object/part. In the world of composites, a "bad batch" of resin can be disastrous. Traditionally, bad batches were typically only discovered after the completion of the entire manufacturing process, resulting in significant waste of time and resources.

In one embodiment, a monitor tag device sensor is sensitive to both the temperature and the electronic properties of the resin. Sensors can simultaneously detect multiple physical parameters (e.g., temperature, complex dielectric constant, strain, etc.). This implies that, by monitoring a properly mixed control batch of the resin mixture, the baseline behavior of the resin chemistry can be documented. This allows for testing of incoming resin batches to verify that the batch behaves as intended, since changes in the chemical ratios or constituents can be detected by using the sensor to monitor key statistical metrics throughout its cure. Resin batches can be identified prior to being used in a production run.

In one embodiment, a monitor tag device assists with process flow from raw materials to inventory. Incoming epoxy components are qualified by measuring the epoxy components with a RFID cure process monitor. In one embodiment a UWB temperature logger and RFID cure pack can be utilized (e.g., slides into the interior of a roll, etc.). The temperature tracking can continue through shipping of the components and finish object/part, including a temperature log is available at receiving stages. Tracking of a component location and temperature profile can also continue through inventory stages. In one embodiment, monitor tag devices assist inventory control (e.g., including cure state produces hierarchy of use first, UWB provides accuracy within 10 cm).

Figure 16:
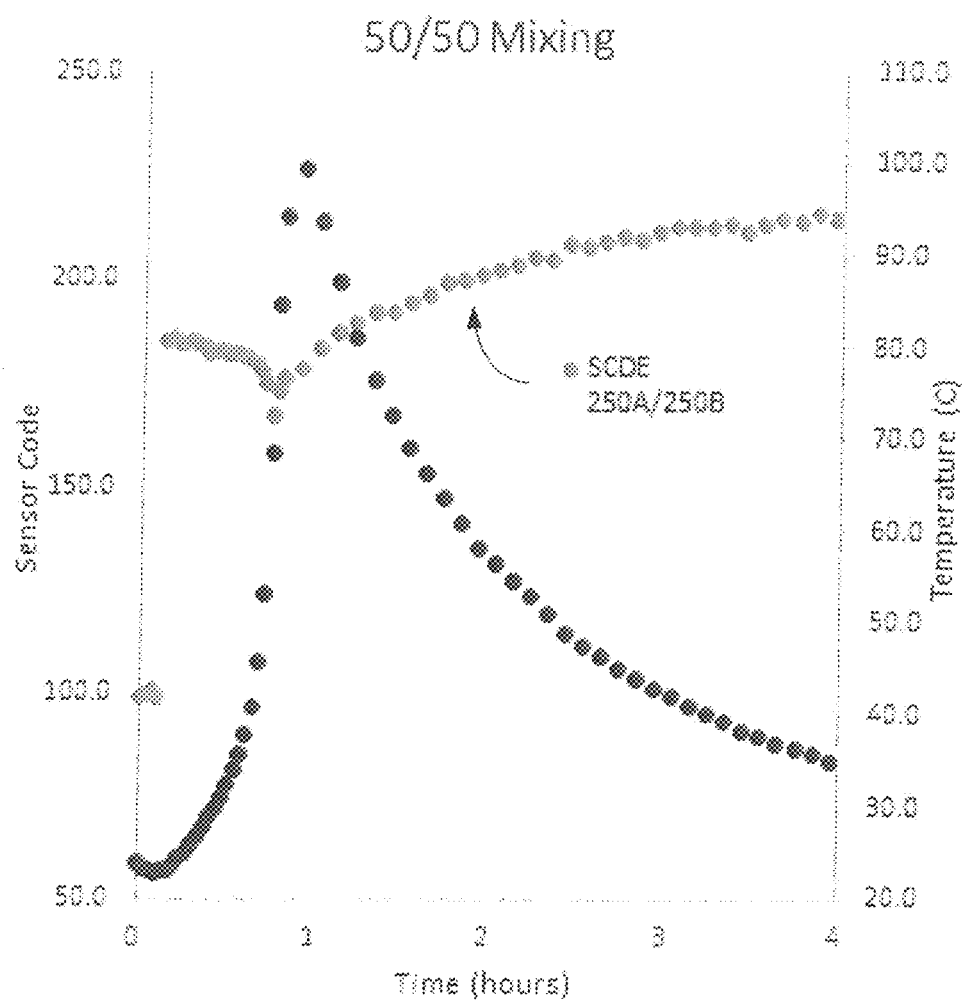
FIG. 16 is a graph illustrating an exemplary resin mixed with the proper mix ratios in accordance with one embodiment.

In one embodiment, a two-part epoxy, specified to be mixed at a ratio of 1:1 by volume, was mixed at various ratios to a controlled volume. FIG. 16 is a graph illustrating an exemplary resin mixed with the proper mix ratios in accordance with one embodiment. In one exemplary implementation, a monitor tag sensor code corresponds to a temperature level. Thus, in FIG. 16 sensor codes are plotted on one of the vertical axis indicators and corresponding temperatures are plotted on the other vertical axis indicators. Time is plotted on the horizontal axis.

With reference still to FIG. 16, there are several distinct features. The first is that the sensor code increases dramatically when the epoxy enters the test vessel. Next, a decrease in the sensor code is observed as the resin cure process progresses. Prior to the temperature reaching a maximum, a sharp decrease in the sensor code is observed, corresponding to a rapid change in the electronic properties of the material. Following a sharp decrease, the sensor code rises as the cure cycle moves to its conclusion. The highly exothermic nature of the reaction is observed, taking the temperature up to 100 C.

Figure 17:
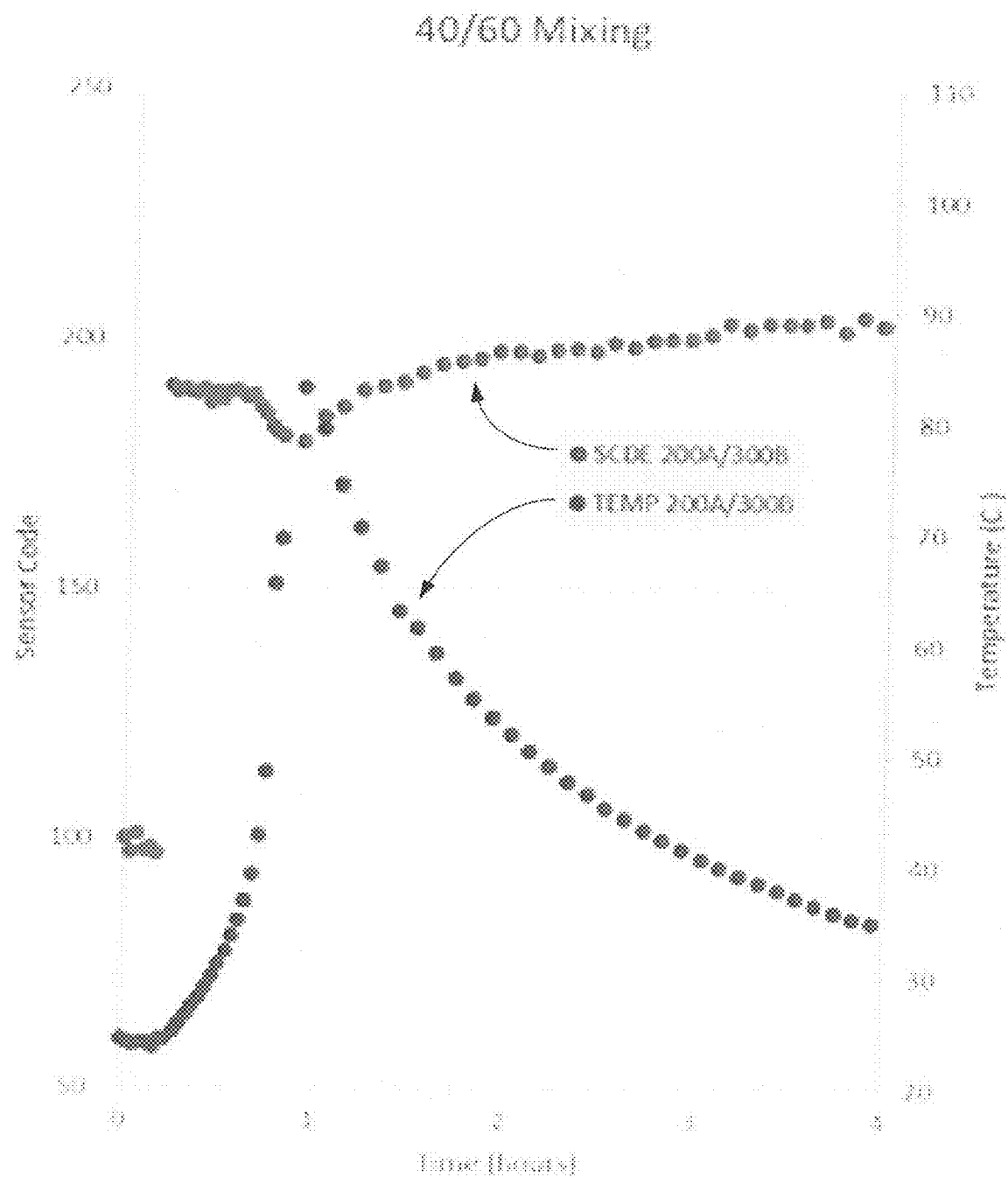
FIG. 17 is a graph illustrating an exemplary resin mixed with different ratios in accordance with one embodiment.

In one embodiment, the temperature monitoring/sensing for quality control testing is sensitive to the chemistry of the resin components. FIG. 17 is a graph illustrating an exemplary resin mixed with different ratios in accordance with one embodiment. FIG. 17 is similar to FIG. 16 except the ratio is changed from 1:1 or 50/50 to a ratio of 4:6 (A:B) or 40/60. As understood from examining the differences in the resulting plot curves in FIGS. 10 and 11, the differences in the resin chemistry impacts the resulting temperature change over time. In FIG. 17, the sensor code again increases when it touches the resin and it gradually move down to a minimum. However, the sharpness and magnitude of the decline have clearly decreased with respect to the curve in FIG. 10. Thus, the behavior of the sensor code is "washed out" when the mix ratio of the resin is not correct (e.g., at the proper/desired ratio of 1:1, etc.).

Metrics that describe the behavior of the sensor code can be used to describe the chemistry of the resin. These metrics can include, but are not limited to, the magnitude of the decrease of sensor code from its initial value, the width of the minimum, and the amount that the sensor code increases from the minimum prior to full cure. These metrics would not have to be constrained to direct measurements, concepts like ratios of measurements, derivatives or integrals could all be excellent candidates for metrics. In one embodiment, while the temperature does increase, the maximum temperature reached is substantially lower. In addition, the temperature peak spreads out in time.

Further metrics that can describe the resin chemistry include the maximum temperature increase and the width of the temperature increase. For convenience, the width of the temperature peak can be defined as the full width between the points where the temperature increase is half of its maximum, sometime termed the full width at half maximum.

It is appreciated there are various potential metrics that can be captured to describe the resin quality. Critical metrics enable statistical process control to be used on incoming resin mixtures. Metrics that show strong dependence upon the chemistry of the resin are excellent candidates to judge the quality of incoming materials. FIG. 18 is an exemplary table listing of metrics of the curing process as a function of the mix ratio of parts A and B of a two-part resin in accordance with one embodiment. In the table of FIG. 18, the depth of the sensor code minimum, the increase of the sensor code (from the minimum value to the final cure value), the maximum temperature during the cure, and the width of the temperature peak are clear indicators of the resin chemistry.

In one embodiment, a monitor tag device is used to qualify materials by using a monitor tag sensor to track the cure state of prepreg materials. Here, fibrous materials are effectively soaked with resin that is slowing curing over time. It is important to use these materials before substantial curing has occurred. In one exemplary implementation, the sensor monitors the cure state of the prepreg prior to use to ensure that no significant curing has occurred and by extension that the prepreg is suitable for use in manufacturing.

Moisture Content

In one embodiment, various reinforcing components (e.g., fibers, Kevlar, fiberglass and carbon fiber, other materials of the object/part, including prepregs, wood, balsa, etc.) must be sufficiently dry prior to being used in order to achieve satisfactory results. Excessive moisture in the composite cure process seriously compromises the quality of the final product. In one embodiment, monitor tag sensors are quite sensitive to moisture as shown in FIG. 1. With reference back to FIG. 1 sensing the moisture content of Kevlar, at time=0, a stack of eight layers of Kevlar is wetted. Over the next day, the fiber gradually dried out. The sensor code (SCDE) clearly tracks the drying process.

Composite Part Integrity Post-Manufacturing

It is appreciated the monitor tag sensors can be left inside of the composite part after the manufacturing process is complete. In one embodiment, a monitor tag sensor is sensitive to density and electrical conductivity changes. Thus, if an air gap formed within the object/part (e.g., changing the density of the material, etc.) this would be detected as a change in sensor code. Another example would be the ingress of water in the material. Water ingress would change both the density of the object/part and the electrical properties, which the sensor clearly shows.

Thus, sensors left within a composite part can detect structural changes, the ingress of water and other changes. An example of this is clearly shown with reference back to FIG. 13. In one embodiment of FIG. 13, a sensor is placed inside of a balsa part, with the balsa part covered by ~2 mm of cured epoxy. The part is submerged in a container of water and periodically scanned by the sensor and weighed. As water enters the part, the weight of the part increases, and the sensor outputs detects the increasing water within the balsa. With reference back to FIG. 9 a composite part that has been submerged underwater. The sensor is embedded in the balsa core. Over time, the water penetrates the balsa. The x-axis is the additional water density, computed by precision weighing of the part. The y-axis shows the sensor moisture indicator.

Concrete Process and Material—Concrete Cure Monitoring

Another composite class includes concrete, a mixture of fine and coarse aggregates bonded together with wet Portland cement that hardens during a cure process. When cured, concrete is a very poor conductor of electricity. However, concrete begins as a wet slurry, where the combination of ions from the constituent materials and water lead to substantial electrical conductivity. Given that monitor tag sensors are very sensitive to electronic properties, the cure state of concrete can be tracked and quantified with a monitor tag sensor.

Concrete Structural Integrity

As a finished part, concrete should have stable electrical properties. More specifically, the density and electrical conductivity of the concrete should be constant over time. A change in density would indicate material leaving the concrete, while an increase in the electrical conductivity would indicate water ingress into the finished part.

In one embodiment, a monitor tag device is used in an Autoclave environment. In one exemplary implementation, the monitor tag device provides information for a localized temperature map. The information can also include temperature profile by part and cure monitoring, including holding a temperature range to fully cure a part. In one embodiment a monitor tag device assists in autoclave process (e.g., inventory of parts loaded for autoclave, time/temperature/cure states first in autoclave, temperature bu part, hold temperature to fully cure coldest part, monitor cure temp range, etc.)

In one embodiment, monitoring tracking is included on a factory floor (e.g., tools, critical infrastructure, etc.). In one embodiment, monitoring tracking is included in power systems (e.g., high power relays, transformers, etc.). In one embodiment, moisture/leak monitoring is included in various implementations, (e.g., gypsum, roofs, automotive, piping/plumbing, condensation, etc.). In one embodiment, monitor tag devices enable increased productivity and cost savings.

In addition to being able to identify changes to the structural integrity of an object (e.g., a concrete member, epoxy object, etc.) a monitor tag sensor can also include identification number, specifically the EPC of the sensor tag. Thus, the changes of the object/part can be tracked to a specific part, including serial number and date of manufacture. In one embodiment, in addition to the quality control functions described above (e.g., determining cure characteristics, moisture content, etc.), a monitor tag device can also be used in inventory control (e.g., determining a location of an object a monitoring tag device is included in, determining a quantity of objects, etc.).

With reference back to FIGS. 1, 2 and 3, a monitor tag device (e.g., 120, 220, 320, etc.) can communicate with reader/interrogator device (e.g., 110, 210, 310, etc.). In one embodiment, the reader/interrogator provides instructions to a monitoring tag device. In one exemplary implementation, a reader/interrogator provides power to the monitoring tag device (e.g., via wireless energy harvesting, etc.). In one embodiment, a reader/interrogator analyzes the information from the monitor tag device and renders/displays a visual representation of the information.

Figure 19:
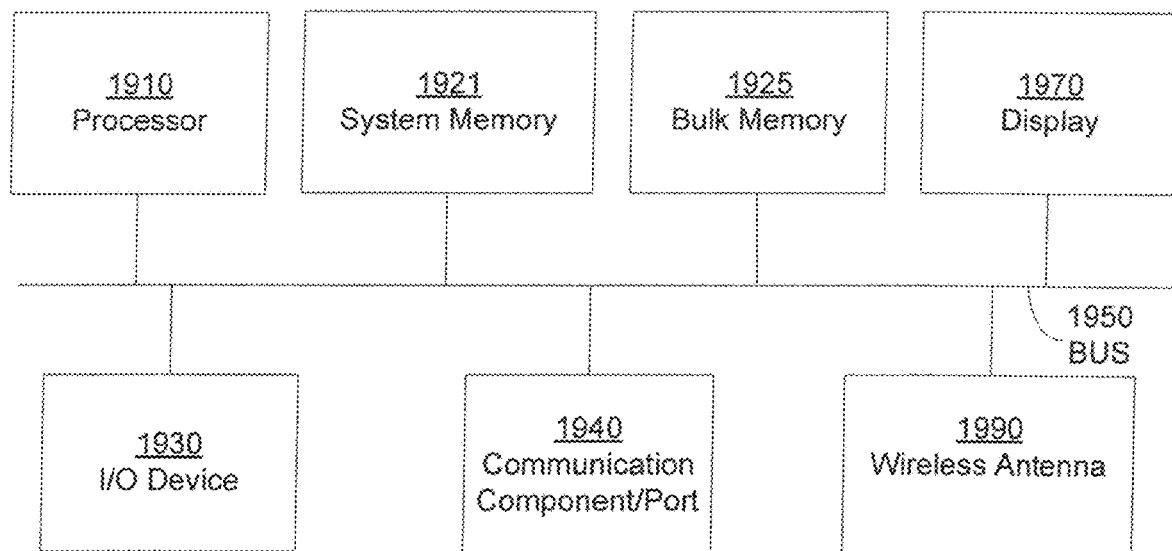
FIG. 19 is a block diagram of an exemplary electronic system 1900 which may be used as a platform to implement and control a process in accordance with one embodiment.

FIG. 19 is a block diagram of an exemplary electronic system 1900 which may be used as a platform to implement and control a process in accordance with one embodiment. Electronic system 1900 includes a central processor 1910, system memory 1915, bulk memory 1925, input/output (I/O) device 1930, communication component/port 1940, display 1970, wireless antenna 1990, and bus 1950. Bus 1950 is configured to communicatively couple and communicate information between the other components (e.g., central processor 1910, system memory 1915, bulk memory 1925, input/output (I/O) devices 1930, communication component/port 1940, etc.). Central processor 1910 is configured to process information and instructions. System memory 1921 (e.g., reads only memory (ROM), random access memory (RAM), etc.) and bulk memory 1925 are configured to store information and instructions for the central processor 1910. I/O device 1930 can communicate information to the system (e.g., central processor 1910, memory 1925, etc.). I/O device 1930 may be any suitable device for communicating information and/or commands to the electronic system (e.g., a keyboard, buttons, a joystick, a track ball, an audio transducer, a microphone, a touch sensitive digitizer panel, eyeball scanner, display component, light emitting diode (LED) display, plasma display device etc.). Communication port 1940 can also be configured to exchange/communicate information with external devices/network (not shown). Communication component/port 1940 can have various configurations (e.g., RS-232 ports, universal asynchronous receiver transmitters (UARTs), USB ports, infrared light transceivers, ethernet ports, IEEE 1394, synchronous ports, etc.). Display 1970 can have various configurations for displaying information (e.g., graphs, instructions, rendering visualization of information sensed by a monitor tag device, etc.). Wireless Antenna 1990 can be configured to communicate with monitor tag devices.

In one embodiment, information is communicated between a reader/interrogator to another system (e.g., to a server, network, the cloud, etc.). In one embodiment, a reader/interrogator can include various read capabilities (e.g., from plurality of monitor tag devices, from plurality of sensors on a single monitor tag device, etc.) and have various configurations (e.g., read from a fixed location, read from mobile location, etc.0.

In one embodiment, the information is communicated to the other system for additional analysis and storage. In one exemplary implementation, artificial intelligence utilized to analyze the information. Results of the analysis can be communicated back to the reader/interrogator.

Figure 20:
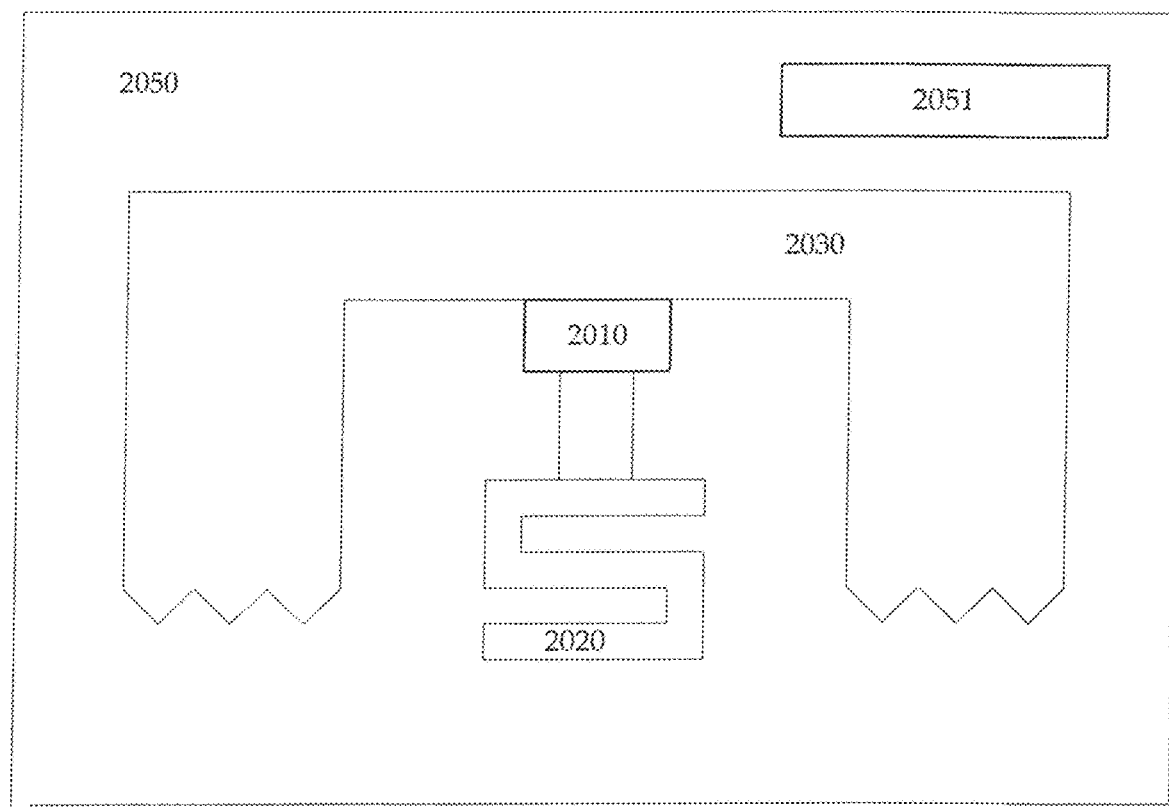
FIG. 20 is a block diagram of an exemplary monitor tag device in accordance with one embodiment

FIG. 20 is a block diagram of an exemplary monitor tag device 2000 in accordance with one embodiment. Monitor tag device 2000 includes control component 2010 (e.g., die, electronics, etc.), sensor 2020, antenna 230, and housing 2050 with readable information 2051.

FIG. 21 is a flow chart of an exemplary monitor tag method 2100 in accordance with one embodiment. In one embodiment, the process/method does not necessarily have to follow in an ordered sequence from block 510, 520, 530, and so on. In one embodiment, the process/method blocks can occur in a different order and include returns/jumps to other blocks.

In block 2110, information is read from a monitor tag 2110. In one embodiment the information include data associated with a parameter/characteristic of an internal material property of an object. In one exemplary implementation, various different parameters/characteristics are sensed and read from a monitor tag device. In one exemplary implementation, the information is substantially continuously sensed and read. In one exemplary implementation, a sensor senses material properties associated with a condition of components, state of an object, progress of a process, and so on.

In block 2120, the information is analyzed. In one embodiment, the analysis includes determining if the material has a particular state (e.g., solid, cured, moist, etc.). In one embodiment, the analysis includes determining if the material is being impacted by a condition (e.g., near failure, performance metric, etc.). In one exemplary implementation, the analysis is substantially continuously performed. In one embodiment, an analysis can have various objectives (e.g., process related, transitioning from one process stage to another process stage, achieving proper cure state, use related, avoiding failure, etc.). In one exemplary implementation, multiple different analysis (e.g., associated with different parameters/characteristics, associated with different objectives, etc.) are performed. The multiple different analysis can be substantially concurrently and coordinated results are forwarded.

In block 2130, an action is implemented in response to the analysis. In one embodiment, the action is associated with a manufacturing/fabrication, construction process (e.g., adding material to a mold, removing material from the mold etc.). In one embodiment, the action is associated with a utilization process in the field (e.g., decrease the speed of a rotating blade, perform a maintenance operation, etc.). In one exemplary implementation, the action is automatically implemented. In one exemplary implementation, multiple actions/adjustments are performed (e.g., substantially continuously, etc.). In one embodiment, an action is performed faster and more effectively/efficiently than possible in traditional approaches (e.g., humanly possible, single action, etc.

While the invention has been described in conjunction with the preferred embodiments, it will be understood that they are not intended to limit the invention to these embodiments. On the contrary, the invention is intended to cover alternatives, modifications, and equivalents. The description is not intended to be exhaustive or to limit the invention to the precise forms disclosed, and obviously many modifications and variations are possible.

Some portions of the detailed descriptions are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. In one embodiment, a process/method does not necessarily have to follow in an ordered sequence (e.g., from block 510, 520, 530, etc.). In one embodiment, the process/method blocks can occur in a different order and include returns/jumps to other blocks. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

It is appreciated that embodiments of the present invention can be compatible and implemented with a variety of different types of tangible memory or storage (e.g., RAM, DRAM, flash, hard drive, CD, DVD, etc.). The memory or storage, while able to be changed or rewritten, can be considered a non-transitory storage medium. By indicating a non-transitory storage medium it is not intend to limit characteristics of the medium, and can include a variety of storage mediums (e.g., programmable, erasable, nonprogrammable, read/write, read only, etc.) and "non-transitory" computer-readable media comprises all computer-readable media, with the sole exception being a transitory, propagating signal.

It is appreciated that the description includes exemplary concepts or embodiments associated with the novel approach. It is also appreciated that the listing is not exhaustive and does not necessarily include all possible implementation. The concepts and embodiments can be implemented in hardware, firmware, software, and so on. In one embodiment, the methods or process describe operations performed by various processing components or units. In one exemplary implementation, instructions, or directions associated with the methods, processes, operations etc. can be stored in a memory and cause a processor to implement the operations, functions, actions, etc.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. The listing of steps within method claims do not imply any particular order to performing the steps, unless explicitly stated in the Claims.

The invention claimed is:

1. A method for monitoring variations in an internal material property of an object, the method comprising:
   sensing variations in a characteristic over time, wherein the characteristic is related to an internal material property of an object and wherein the variations are sensed from within the object; and
   communicating information on the variations in the characteristic from within the object to a remote component, and wherein the communication is wireless.

2. The monitoring method of claim 1, wherein the characteristic is related to a parameter associated with the material property.

3. The monitoring method of claim 1, further comprising harvesting energy from an externally generated electromagnetic signal.

4. The monitoring method of claim 1, further comprising mapping the variations to physical properties of a material in the object.

5. The monitoring method of claim 1, wherein the characteristic is one of a plurality of characteristics sensed, and the variations sensed are associated with a plurality of various material characteristics of a material in the object.

6. The monitoring method of claim 1, wherein the material properties are related to a composite material.

7. The monitoring method of claim 1, wherein a plurality of datapoints is collected and wherein the plurality of datapoints correspond to the sensing of the characteristic.

8. The monitoring method of claim 1, further comprising performing analysis operations of the information.

9. The monitoring method of claim 1, further comprising rendering a visualization of the characteristic being sensed over time.

10. A material internal property monitoring method comprising:
    sensing variations in a characteristic that affects a resonant antenna over time, wherein the characteristic is related to material properties of a material in an object, and wherein the characteristic is selected from the group comprising temperature, strain, index of refraction, moisture, relative humidity, motion, differential capacitance, light, PH level, and pressure; and
    communicating information to and from a remote device wirelessly, wherein the information comprises indications of variations sensed in the characteristic.

11. A monitoring method of claim 10, further comprising mapping the information on the variations sensed in the characteristic over time to a material property of the object.

12. A monitoring method of claim 11, wherein the sensor is located within a portion of the material included in the object and the variations are associated with a material property inside the material.

13. A monitoring method of claim 11, wherein the sensor is located on a surface of the material included in the object and the variations are associated with a material property inside the material.

14. A monitoring method of claim 11, further comprising harvesting energy.

15. A monitoring method of claim 14, wherein the energy is harvested by a wireless transceiver component from an externally generated signal.

16. A monitoring method of claim 11, wherein the characteristic is one of a plurality sensed characteristics.

17. A monitoring method of claim 11, further comprising:
    performing operations on the information; and
    presenting modified data in a visual representation/report, wherein the modified data corresponds to results of performing operations on the information.

18. A monitoring method of claim 11, wherein the characteristic of the material is determined based on variations associated with the index of refraction.

* * * * *